(12) United States Patent
Makino et al.

(10) Patent No.: US 6,506,481 B2
(45) Date of Patent: Jan. 14, 2003

(54) CERAMIC MEMBER FOR BONDING, PROCESS FOR PRODUCING THE SAME, VACUUM SWITCH, AND VACUUM VESSEL

(75) Inventors: Yusuke Makino, Kasugai (JP); Tsuneaki Takashima, Iwakura (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 09/769,751

(22) Filed: Jan. 26, 2001

(65) Prior Publication Data

US 2001/0036541 A1 Nov. 1, 2001

(30) Foreign Application Priority Data

| Jan. 26, 2000 | (JP) | ........................ 2000-017213 |
| May 30, 2000 | (JP) | ........................ 2000-160029 |

(51) Int. Cl.$^7$ ............................. B32B 3/00; C03B 29/00
(52) U.S. Cl. .................... 428/210; 428/450; 156/89.12; 156/89.14; 156/89.19; 156/89.21
(58) Field of Search ................................. 428/210, 450, 428/209; 174/257; 156/89.16, 89.21, 89.19, 89.14, 89.12

(56) References Cited

U.S. PATENT DOCUMENTS

| 3,284,174 | A | | 11/1966 | Zimmer |
| 4,381,198 | A | | 4/1983 | Kondo et al. ............... 106/1.12 |
| 4,883,704 | A | * | 11/1989 | Sato et al. .................... 428/209 |
| 5,063,121 | A | * | 11/1991 | Sato et al. .................... 428/432 |
| 5,286,927 | A | * | 2/1994 | Ueno et al. .................... 174/257 |
| 5,529,852 | A | * | 6/1996 | Sasame et al. ............... 428/620 |
| 5,604,018 | A | * | 2/1997 | Horiuchi et al. ............. 428/210 |
| 5,622,769 | A | * | 4/1997 | Kozuka et al. .............. 428/209 |

FOREIGN PATENT DOCUMENTS

| EP | 0 285 127 | 10/1988 | |
| JP | 53-124772 | 10/1978 | |
| JP | 55-121294 | 9/1980 | ............ H05B/3/14 |
| JP | 57-206088 | 12/1982 | ............ H05K/1/09 |
| JP | 1-205053 | 8/1989 | |
| JP | 1-209783 | 8/1989 | ............ H05K/1/03 |
| JP | 3-280491 | 12/1991 | ............ H05K/3/46 |

OTHER PUBLICATIONS

XP–002166841—English Abstract (Aug. 11, 1983).
XP–002166842—English Abstract (Jul. 13, 1973).
XP–002166843—English Abstract (Dec. 17, 1985).
European Search Report No Date.

* cited by examiner

*Primary Examiner*—Cathy Lam
(74) *Attorney, Agent, or Firm*—Sughrue Mion, PLLC

(57) ABSTRACT

A ceramic member for bonding comprises: a ceramic base which is a sintered ceramic; and a metallic layer formed on the ceramic base by metallization, wherein the metallic layer comprises 70 to 85% by weight of at least one of tungsten and molybdenum and 0.5 to 8.5% by weight of nickel.

25 Claims, 10 Drawing Sheets

CERAMIC MEMBER FOR BONDING, PROCESS FOR PRODUCING THE SAME, VACUUM SWITCH, AND VACUUM VESSEL

BACKGROUND OF THE INVENTION

1. Field of the Invention

The present invention relates to members required to have bonding strength, airtightness, and other properties as in the case of bonding a metal to a ceramic. More particularly, the invention relates to a process for producing a ceramic member for bonding and to a ceramic member for bonding, bonded objects, a vacuum switch, and a vacuum vessel.

2. Background Art

The molybdenum-manganese method (Mo—Mn method; Telefunken method) has conventionally been known as a method for metallizing a surface of a ceramic base.

In this Mo—Mn method, a metallizing ink prepared by adding bonding aids, which help bonding with ceramics, such as a manganese powder, titanium powder, and glass ingredient ($SiO_2$) to a powder of high-melting metals such as tungsten and molybdenum and mixing the powder mixture with an organic binder to make the mixture paste (hereinafter sometimes referred to as "metallizing ink") is applied to a ceramic base and the ink layer is baked (baking method).

The technique of the related art described above necessitates a baking temperature as high as from 1,300 to 1,500° C. for metallization and, hence, has had a problem that the sintering cost regarding furnace structure, utilities, expendable heat-resistant materials, etc. is high.

Another problem is that the ceramic itself deforms in the high-temperature baking, resulting in a product which does not satisfy dimensional accuracy.

Although a measure in overcoming the problem described above may be to bake a metallizing ink having a conventional composition at a temperature lower than 1,300° C., this low-temperature baking poses a problem that a sufficient bonding strength cannot be obtained. An improvement in this respect has been desired.

Furthermore, in the case where the metallic layer formed by metallization by the Mo—Mn method is to be bonded to another metallic member or the like by brazing, it is necessary to improve the wettability thereof by a brazing material so as to obtain satisfactory bonding. Although it is hence inevitable to conductor post-treatments such as nickel plating and subsequent sintering, there has been a problem that these post-treatments make the protection process complicated.

SUMMARY OF THE INVENTION

The invention has been achieved in order to eliminate the problems described above.

an object of the invention is to provide a process by which a ceramic member for bonding having a metallization-deposited metallic film with sufficient bonding strength can be obtained even through low-temperature sintering.

Another object of the invention is to provide a ceramic member for bonding, bonded objects, a vacuum switch, and a vacuum vessel.

In the method of the related art of metallization, metals are bonded to a ceramic mainly by two actions, i.e., the sintering of high-melting metal particles and the diffusion and infiltration of a glass ingredient into spaces among the particles.

When this method of the related art of metallization is conducted at a sufficiently high sintering temperature, not only the sintering of the high-melting metals proceeds to give a metallic layer having improved strength, but also a vitreous ingredient (e.g., $SiO_2$) contained in the ceramic or ink infiltrates into spaces among the high-melting metal particles to mechanically improve the bonding strength based on an anchoring effect. However, in order for the reactions which bring about these effects to proceed sufficiently, a temperature of 1,300° C. or higher has been necessary.

In contrast, sintering in the invention can be conducted at a lower temperature because nickel reacts with high-melting metals to accelerate the sintering. In the case where the ink contains $SiO_2$, the metallic layer which is being formed by metallization is sufficiently filled with a vitreous ingredient due to the $SiO_2$, so that baking can be conducted at a temperature as low as, e.g., from 1,080 to 1,250° C. (preferably from 1,100 to 1,250° C., more preferably from 1,100 to 1,200° C.).

The invention has been completed based on that finding. The invention will be explained below.

(1) Those objects are accomplished with the invention of item 1, which is a process for producing a ceramic member for bonding which comprises mixing a mixture comprising high-melting metal particles of tungsten and/or molybdenum and particles of nickel with an organic binder to produce a paste metallizing ink, applying the metallizing ink to a ceramic base which is a sintered ceramic, and baking the resultant ink layer to form a metallic layer.

In this invention, since the metallizing ink contains nickel, the nickel reacts with high-melting metals to accelerate sintering in the layer which is being formed by metallization, as stated above. Because of this, the metal particles can be sufficiently sintered even at a temperature as low as, e.g., from 1,080 to 1,250° C.

As a result, the sintering cost regarding furnace structure, utilities, expendable heat-resistant materials, etc. can be reduced as compared with conventional ones. Moreover, the baking conducted at a low temperature produces a marked effect that the ceramic itself is less apt to deform and high dimensional accuracy is obtained. A further advantage is that since the metal particles can be sufficiently sintered even at such a low temperature, high bonding strength can be secured.

While the organic binder for use in the present invention is not limiting, an organic binder where solid binder (e.g., ethyl cellulose) is dissolved in a solvent (e.g., turpentine oil, butyl glycol) may be used. The organic binder may be used in an amount of about 10 to 35% by weight based on 100% by weight of the total amount of the organic binder and the particle mixture. The solid binder may be used in an amount of about 2 to 4.5% by weight based on 100% by weight of the total amount of the solid binder and the particle mixture.

(2) The invention of item 2 is the process for producing a ceramic member for bonding, wherein the mixture comprises from 70 to 97% by weight the high-melting metal particles of tungsten and/or molybdenum and from 1 to 10% by weight the particles of nickel.

Since the metallizing ink for use in this invention contains nickel in an amount of from 1 to 10% by weight, the nickel reacts with high-melting metals to accelerate sintering in the layer which is being formed by metallization, as stated above. Because of this, the metal particles can be sufficiently sintered even at a temperature as low as, e.g., from 1,080 to 1,250° C. As a result, the same effects as of item 1 are produced.

(3) The invention of item 3 is
the processing for producing a ceramic member for bonding of item 1 or 2, wherein the metallizing ink further contains at least one member selected from the group consisting of from 5 to 10% by weight particles of manganese, from 0.5 to 2% by weight particles of titanium and/or $TiH_2$, and from 2 to 15% by weight particles of $SiO_2$.

In this metallizing ink, the manganese ingredient, serving as a bonding aid, is oxidized by the moisture contained in the sintering atmosphere to thereby improve the wetting ability and flowability of a glass ingredient.

The titanium ingredient, which also serves as a bonding aid, is exceedingly active and hence contributes to chemical bonding to the ceramic base.

Furthermore, $SiO_2$, which is vitreous, infiltrates into spaces among high-melting metal particles to thereby mechanically improve bonding strength based on an anchoring effect. In particular, when sintering is conducted at a low temperature, $SiO_2$ is less apt to be fed from the ceramic member for bonding. Even through such low-temperatures sintering, however, high bonding strength can be obtained by using a metallizing ink to which $SiO_2$ has been added.

(4) The invention of item 4 is
a ceramic member for bonding which comprises a ceramic base which is a sintered ceramic and a metallic layer formed on the ceramic base by metallization, the metallic layer comprising tungsten and/or molybdenum as high-melting metal(s) and particles of nickel.

As explained above with regard to the invention of item 1, since the metallic layer formed by metallization contains nickel, it has undergone sufficient sintering event at a temperature as low as, e.g., from 1,080 to 1,250° C. because of the reactions of the nickel with high-melting metals during the sintering for metallization.

As a result, the sintering cost regarding furnace structure, utilities, expendable heat-resistant materials, etc. is low as compared with conventional ones. Moreover, since the ceramic itself is less apt to deform during the baking due to the low baking temperature, this ceramic member for bonding has high dimensional accuracy. Furthermore, even when the sintering is conducted at a low temperature, high bonding strength can be secured.

(5) The invention of item 5 is
the ceramic member for bonding of item 4, wherein the metallic layer contains from 70 to 85% by weight tungsten and/or molybdenum as high-melting metal (s) and from 0.5 to 8.5% by weight nickel.

As explained above with regard to the invention of item 4, since metallic layer formed by metallization contains nickel in an amount of from 1 to 10% by weight, it has undergone sufficient sintering even at a temperature as low as, e.g., from 1,080 to 1,250° C. because of the reactions of the nickel with high-melting metals during the sintering for metallization. As a result, the same effects as of item 4 are produced.

(6) The invention of item 6 is
the ceramic member for bonding of item 5, wherein the metallic layer further contains at least one member selected from the group consisting of from 1 to 3% by weight manganese, from 0.05 to 2.5% by weight titanium, and from 8 to 20% by weight $SiO_2$ in terms of silicon oxide amount.

As explained above with regard to the invention of item 3, the manganese ingredient and the titanium ingredient each functions as a bonding aid.

Furthermore, the silicon ingredient functions as vitreous $SiO_2$. This $SiO_2$ infiltrates into spaces among high-melting metal particles to thereby mechanically improve bonding strength based on an anchoring effect. In particular, high bonding strength can be obtained even through low-temperature sintering.

(7) The invention of item 7 is
a bonded object obtained by bonding a metallic member to a ceramic member for bonding of any one of items 4 to 6 through the metallic layer.

The bonded object of this invention is characterized in that a ceramic member of bonding is bonded to a metallic member with the above-described metallic layer comprising ingredients including nickel.

Consequently, this bonded object comprising a ceramic member for bonding and a metallic member bonded thereto can be produced at a reduced cost, and the bonded object obtained has high bonding strength and high dimensional accuracy.

(8) The invention of item 8 is
a bonded object obtained by bonding two ceramic members for bonding of any of items 4 to 6 to each other through the metallic layer of each ceramic member.

The bonded object of this invention is characterized in that two ceramic members for bonding are bonded to each other with the above-described metallic layers comprising ingredients including nickel. The bonding surface of each metallic layer is preferably plated prior to the bonding. A preferred method for the bonding is brazing.

Consequently, this bonded object comprising two ceramic members bonded to each other can be produced at a reduced cost, and the bond object obtained has high bonding strength and high dimensional accuracy.

(9) The invention of item 9 is
a vacuum switch having the bonded object of item 7 or 8.

The vacuum switch of this invention is characterized by having either of the bonded objects described above. An example of this vacuum switch is an electric circuit switch employing a ceramic insulating valve, in particular one suitable for the switching of high-voltage large-current electricity.

(10) The invention of item 10 is
a vacuum vessel comprising the bonded object of item 7 or 8.

The vacuum vessel of this invention (e.g., an insulating valve) is used in e.g., the vacuum switch described above. A vacuum switch (electrical circuit switch) can be fabricated by disposing electrodes and other necessary members in this vacuum vessel.

(11) The invention of item 11, which is
a process for producing a ceramic member for bonding which comprises: a first step in which a first paste prepared by mixing a first mixture comprising molybdenum particles and nickel particles with an organic binder is applied to a ceramic base which is a sintered ceramic and the resultant coating layer is dried to form a first layer; a second step in which a second paste prepared by mixing a second mixture comprising particles of nickel or nickel oxide and at-least one member selected from the group consisting of copper particles, copper oxide particles, manganese particles, and manganese oxide particles or comprising particles of a nickel-copper alloy or particles of a nickel-manganese alloy with an organic binder is applied to the first layer and the resultant coating layer is dried to form a second layer; and a third step in which the first layer and the second layer are heated and baked.

The second mixture for use in this process is a mixture comprising particles of nickel or nickel oxide and at least one member selected from the group consisting of copper particles, cooper oxide particles, manganese particles, and manganese oxide particles or a mixture comprising particles of a nickel-copper alloy or particles of a nickel-manganese alloy.

In this invention, since the first paste contains nickel, the nickel reacts with the molybdenum, which is a high-melting metal, to accelerate sintering in the layer which is being formed by metallization. Because of this, metal particles can sufficiently sinter even at a temperature as low as, e.g., from 1,080 to 1,180° C. (preferably from 1,100 to 1,160° C.).

As a result, the sintering cost regarding furnace structure, utilities, expendable heat-resistant materials, etc. can be reduced as compared with conventional ones. Moreover, due to the baking conducted at a low temperature, the ceramic itself is less apt to deform and high dimensional accuracy is obtained. Furthermore, since the metal particles can be sufficiently sintered even at such a low temperature, high bonding strength can be secured.

In particular, since the second paste contains copper and/or manganese besides nickel, a lowered melting point can be obtained and a dense alloy layer can be formed (on the layer formed by metallization). Because of this, the ceramic member for bonding can be satisfactorily brazed even without a troublesome post-treatment, e.g., nickel plating, conventionally conducted after baking. Namely, this invention produces a marked effect that a considerable simplification in production process is possible.

Furthermore, since the second layer becomes an alloy, the excessive diffusion of nickel into the first layer, which contains a molybdenum, is diminished. Consequently, the molybdenum can be prevented from excessively sintering to reduce strength.

The baking in the third step is preferably conducted in a moist reducing atmosphere especially at a temperature in the range of from 1,080 to 1,180° C., because the product obtained through baking under these conditions has high bonding strength and high airtightness.

The baking in the third step may be carried out at the same time to both of the first and second layers after the second step. The baking of the first layer may be carried out after the first step, and the baking of the second layer may be carried out after the second step.

(2) The invention of item 12 is
the process for producing a ceramic member for bonding of item 11, wherein the first mixture comprises from 70 to 94% by weight the molybdenum ingredient and form 1 to 10% by weight the nickel ingredient.

In this invention, since the first mixture contains at least 1% by weight nickel, the nickel reacts with the molybdenum, which is a high-melting metal, to accelerate sintering in the layer which is being formed by metallization. Because of this, the metal particles can sufficiently sinter even at a low temperature in that range. Moreover, since the nickel content is 10% by weight or lower, the molybdenum can be prevented from excessively sintering and, hence, the strength of bonding between the ceramic base and the layer formed by metallization can be prevented from being insufficient.

Furthermore, since the first mixture contains molybdenum in an amount of from 70 to 94% by weight, a tenacious layer can be formed by metallization.

(13) The invention of item 13 is
the process for producing a ceramic member for bonding of item 11 or 12, wherein the first mixture further contains from 2 to 23% by weight silicon oxide ingredient (e.g., as silicon oxide particles).

In this invention, since the first mixture contains a silicon oxide ($SiO_2$) ingredient in an amount of from 2 to 23% by weight, a higher degree of bonding is attained between the ceramic base and the layer formed by metallization.

(14) The invention of item 14 is
the process for producing a ceramic member for bonding of any one of items 11 to 13, wherein the second mixture comprises from 35 to 75% by weight the nickel ingredient (in particles of nickel or nickel oxide or particles of a nickel-copper alloy or of a nickel-manganese alloy) and from 25 to 65% by weight the copper ingredient (in copper particles, copper oxide particles, or particles of a nickel-copper alloy) or the manganese ingredient (in manganese particles, manganese oxide particles, or particles of a nickel-manganese alloy).

In this invention, since the second mixture contains the nickel ingredient in an amount of from 35 to 75% by weight, the strength of bonding to the layer formed by metallization is high and high airtightness is obtained.

Furthermore, since the content of the copper or manganese ingredient in the second mixture is 25% by weight or higher, the resultant alloy layer has excellent suitability for brazing and high strength. Moreover, since the content of the copper or manganese ingredient therein is 65% by weight or lower, infiltration into the layer which is being formed by metallization can be inhibited and, hence, the strength of bonding between the ceramic base and the layer formed by metallization can be secured.

In the case where the second mixture contains a metal oxide such as nickel oxide or copper oxide, it is preferred to add $SiO_2$ thereto because this addition further improves airtightness.

(15) The invention of item 15 is
a ceramic member for bonding which comprises: a ceramic base which is a sintered ceramic; a metallic layer formed by metallization which is a lower layer deposited on a surface of the ceramic base and comprising molybdenum and nickel; and an alloy layer which is an upper layer comprising nickel and either copper or manganese and deposited on the metallic layer either directly or through an interlayer.

In this invention, since the lower layer formed by metallization contains nickel, it can have undergone sufficient sintering even at a low temperature due to the acceleration of sintering by the nickel during baking.

As a result, the sintering cost regarding furnace structure, utilities, expendable heat-resistant materials, etc. can be low as compared with conventional ones. The low-temperature baking enables the ceramic member to have high dimensional accuracy. Furthermore, since sufficient sintering is possible even at a low temperature, high bonding strength can be secured.

In particular, since the alloy layer as an upper layer in this invention contains copper and/or manganese besides nickel, a reducing melting point was obtained in baking and the alloy layer formed can hence be a dense layer. Because of this, the ceramic member for bonding can be satisfactorily brazed even without a post-treatment, e.g., nickel plating, conventionally conducted after baking. Namely, a considerable simplification in production process is possible.

Although the alloy layer as an upper layer may have been formed directly on the lower layer formed by metallization, an interlayer differing in constitution from each of the lower layer formed by metallization and the alloy layer as an upper layer may have been formed between the lower and upper layers.

(16) The invention of item 16 is the ceramic member for bonding of item 15, wherein the metallic layer formed by metallization comprises from 71 to 88% by weight molybdenum and from 0.7 to 5.5% by weight nickel.

In this invention, since the layer formed by metallization contains nickel in an amount of 0.7% by weight or larger, it can have undergone sufficient sintering even at a low temperature. Moreover, since the nickel content therein is 5.5% by weight or lower, the molybdenum has been prevented from excessively sintering and, hence, the strength of bonding between the ceramic base and the layer formed by metallization can be prevented from being insufficient.

Furthermore, since the layer formed by metallization contains molybdenum in an amount of from 71–88% by weight, it is a tenacious layer.

(17) The invention of item 17 is the ceramic member for bonding of item 15 or 16, wherein the metallic layer formed by metallization further contains from 3.0 to 18.0% by weight silicon oxide ingredient in terms of oxide amount.

In this invention, since the layer formed by metallization contains a silicon oxide ($SiO_2$) ingredient in an amount of from 3.0 to 18.0% by weight, it is exceedingly tenaciously bonded to the ceramic member.

(18) The invention of item 18 is the ceramic member for bonding of any one of items 15 to 17, wherein the alloy layer comprises from 36 to 61.3% by weight nickel and either from 33 to 60% by weight copper or from 2 to 30% by weight manganese.

In this invention, since the alloy layer contains nickel in an amount of from 36 to 61.3% by weight, the strength of bonding between the alloy layer and the layer formed by metallization is high and high airtightness is obtained.

Furthermore, since the copper content in the alloy layer is 33% by weight or higher, the alloy layer has excellent suitability for brazing and high strength. Moreover, since the copper content therein is 60% by weight or lower, this contributes to an improvement in the strength of bonding between the ceramic base and the layer formed by metallization. On the other hand, since the manganese content in the alloy layer is 2% by weight or higher, the alloy layer has excellent suitability for brazing and high strength. In addition, since the manganese content therein is 30% by weight or lower, this contributes to an improvement in the strength of bonding between the ceramic base and the layer formed by metallization.

(19) The invention of item 19 is the ceramic member for bonding of any one of items 15 to 18, wherein the interlayer formed between the metallic layer formed by metallization as a lower layer and the alloy layer as an upper layer is an interlayer comprising a nickel-molybdenum alloy.

This invention shows an example of the components of the interlayer. Although the interlayer may generate depending on sintering conditions, etc., the presence of this interlayer exerts little influence on properties including boding strength.

(20) The invention of item 20 is a bonded object obtained by bonding a metallic member to a ceramic member for bonding of any one of items 15 to 19 through at least the metallic layer formed by metallization and the alloy layer.

In this invention, the ceramic member for bonding and the metallic member have been bonded to each other through the layer formed by metallization and the alloy layer described above. More specifically, the ceramic member for bonding, obtained by forming a metallic layer by metallization on a surface of a ceramic base and further forming an alloy layer on the metallic layer, has been united with the metallic member by bonding the alloy layer to the metallic member with, e.g., a brazing material. The ceramic member may have the interlayer between the layer formed by metallization and the alloy layer.

Consequently, there is no need of conducting nickel plating (of the surface of the layer formed by metallization) and subsequent sintering as in conventional processes, and the metallic member can be directly bonded to the alloy layer by brazing. Therefore, the bonded object can be produced through a smaller number of steps at low cost. Furthermore, this bonded object has high bonding strength and high dimensional accuracy.

(21) The invention of item 21 is a bonded object obtained by bonding two ceramic members for bonding of any one of items 15 to 19 to each other through at least the metallic layer formed by metallization and the alloy layer of each ceramic member.

In this invention, the two ceramic members for bonding have been bonded to each other through the layers formed by metallization and the alloy layers described above. Each ceramic member may have the interlayer described above between the layer formed by metallization and the alloy layer.

An example of this bonded object is one obtained from two ceramic members for bonding each having a metallic layer formed by a metallization and an alloy layer by bonding the alloy layers to each other with a brazing material.

Consequently, the nickel plating and subsequent sintering conducted in conventional processes are unnecessary as in the case of the bonded object of item 20, and the alloy layer can be directly bonded to a metallic member by brazing. Therefore, this bonded object can be produced at low cost and has high bonding strength and high dimensional accuracy.

(22) The invention of item 22 is a vacuum switch having the bonded object of item 20 or 21.

The vacuum switch of this invention is characterized by having either of the bonded objects described above. An example of this vacuum switch is an electric circuit switch employing a ceramic insulating valve, in particular one suitable for the switching of high-voltage large-current electricity.

(23) The invention of item 23 is a vacuum vessel comprising the bonded object of item 20 or 21.

The vacuum vessel of this invention (e.g., an insulating valve) is used in, e.g., the vacuum switch described above. A vacuum switch (electrical circuit switch) can be fabricated by disposing electrodes and other necessary members in this vacuum vessel.

Figure 1:
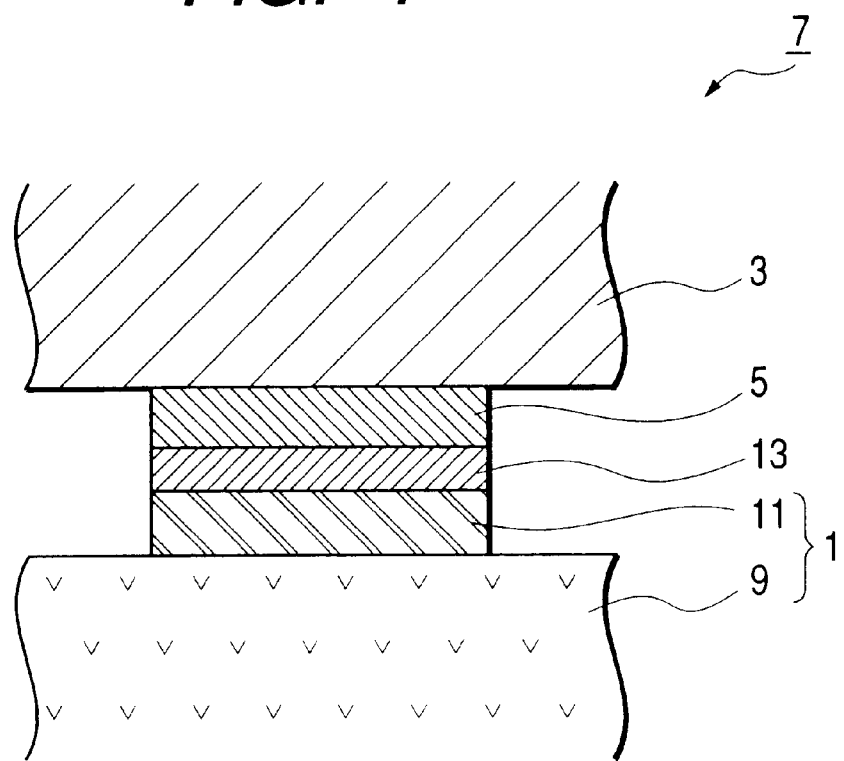
FIG. 1 is a sectional view illustrating an important part of a bonded object shown in Example 1.

Reference numerals in the drawing represent as follows:
1 . . . ceramic member for bonding
3 . . . metallic member
5, 35, 162, 219, 221 . . . brazing material
7, 37, 70, 370 . . . bonded object
9 . . . ceramic base
11 . . . metallic layer formed by metallization
13 . . . deposit layer formed by plating
31 . . . first ceramic member for bonding
33 . . . second ceramic member for bonding
39 . . . first ceramic base
41 . . . first metallic layer formed by metallization
45 . . . second ceramics base
47 . . . second metallic layer formed by metallization
161, 207 . . . arc shield
101 . . . insulating valve
100, 100', 200, 200' . . . vacuum switch (high-load switch)
171, 211, 213 . . . metallic layer formed by metallization
201 . . . upper insulating valve
203 . . . lower insulating valve
205 . . . connecting member
313, 374, 315, 317 . . . alloy layer
343 . . . first alloy layer
349 . . . second alloy layer

DESCRIPTION OF THE PREFERRED EMBODIMENT

Embodiments (examples) of the process for producing a ceramic member for bonding, the ceramic member for bonding, the bonded objects, the vacuum switch, and the vacuum vessel of the invention will be explained below by reference to the drawings.

EXAMPLE 1

A bonded object comprising a ceramic member for bonding and a metallic member is described as an embodiment.

a) FIG. 1 diagrammatically shows this embodiment, which is a bonded object 7 comprising a ceramic member for bonding 1 and a metallic member 3 bonded thereto with a brazing material 5.

More specifically, the ceramic member for bonding 1 comprises a ceramic base 9 and a metallic layer 11 formed thereon by metallization. A deposit layer (plating layer) 13 has been formed by plating on the metallic layer 11. The deposit layer 13 and the metallic member 3 have been bonded to each other with the brazing material 5, whereby the ceramic member for bonding 1 and the metallic member 3 have been united with each other.

b) A process for producing a ring-shaped test piece as an example of this bonded object will be explained below together with a process for producing a ceramic member for bonding.

(1) First, particulate metallizing-ink ingredients shown in Table 1 which will be given later were pulverized and mixed together, and this powder mixture (e.g., 87% by weight) was mixed with an organic binder (e.g., 13% by weight) such as, e.g., ethyl cellulose to obtain a paste. Thus, a metallizing ink was produced.

(2) The metallizing ink thus produced was applied to a surface of an alumina-based ceramic base 9 (e.g., 92% by weight alumina) which was a sintered ceramic (e.g., a ring-shaped test piece having a thickness of 5 mm, an outer diameter of 30 mm, and an inner diameter of 8.5 mm) in a thickness of about from 10 to 20 $\mu$m.

(3) Subsequently, the ceramic base 9 coated with the metallizing ink was placed in a furnace and sintered (metallized) at the temperatures of from 1,150 to 1,350° C. shown in Table 2 below in an atmosphere of $H_2/N_2$ (1:1) forming gas having a wetter temperature of 50° C. Thus, a ceramic member for bonding 1 was obtained which consisted of the ceramic base 9 and a metallic layer 11 formed thereon by metallization.

(4) The surface of the metallic layer 11 (metallized side) was electroplated with nickel to form a deposit layer 13. This deposit layer 13 was sintered (sintered) in an $H_2$ atmosphere at a temperature of 830° C.

(5) Thereafter, the ceramic member for bonding 1 and a metallic member 3 made of Kovar (Fe—Ni—Co) were brazed together.

Specifically, a foil of a silver brazing material (BAg-8) 5 was interposed between the deposit layer 13 and the metallic member 3 (e.g., a Kovar disk having a thickness of 1 mm and an outer diameter of 16 mm). This assemblage was heated at a given brazing temperature and then cooled to braze the ceramic member for bonding 1 and the metallic member 3 together. Thus, a bonded object 7 was completed.

Figure 2:
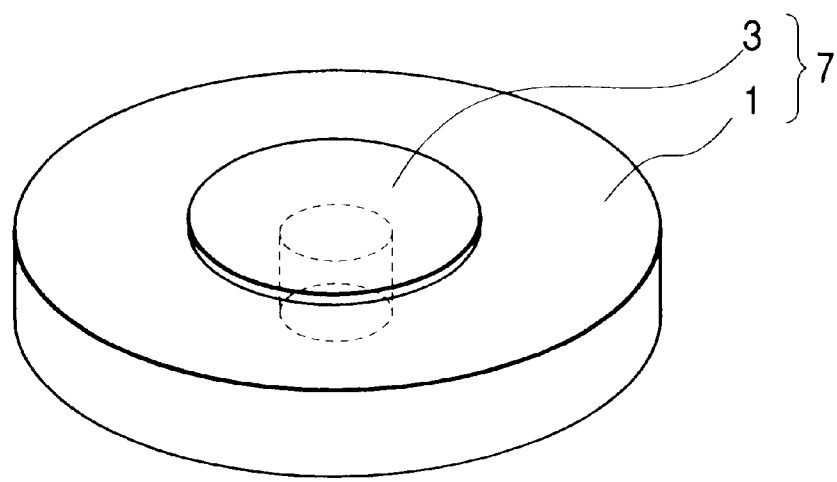
FIG. 2 is a slant view illustrating a bonded object obtained in Example 1.

Using the metallizing inks having different compositions as shown in Table 1 below, ring-shaped test pieces (samples) Nos. 2 to 17 as shown in FIG. 2 were produced, as bonded objects 7 to be tested, through the steps (1) to (5) described above. Sample No. 1 as a comparative example was further produced using a metallizing ink having a different composition (not containing nickel).

TABLE 1

| Sample No. | Content in metallizing ink [wt %] | | | | | Total | Remarks |
|---|---|---|---|---|---|---|---|
| | Item 1 | | Item 2 | | | | |
| | Mo | Ni | Mn | Ti | SiO₂ | | |
| 1 | 91.5 | 0.0 | 7.3 | 1.2 | 0.0 | 100.0 | comparative example |
| 2 | 81.0 | 0.5 | 7.3 | 1.2 | 10.0 | 100.0 | item 1 |
| 3 | 80.5 | 1.0 | 7.3 | 1.2 | 10.0 | 100.0 | items 1–3 |
| 4 | 76.5 | 5.0 | 7.3 | 1.2 | 10.0 | 100.0 | items 1–3 |
| 5 | 71.5 | 10.0 | 7.3 | 1.2 | 10.0 | 100.0 | items 1–3 |
| 6 | 68.5 | 13.0 | 7.3 | 1.2 | 10.0 | 100.0 | item 1 |
| 7 | 85.5 | 5.0 | 7.3 | 1.2 | 1.0 | 100.0 | items 1, 2 |
| 8 | 71.5 | 5.0 | 7.3 | 1.2 | 15.0 | 100.0 | items 1–3 |
| 9 | 66.9 | 5.0 | 7.3 | 1.2 | 20.0 | 100.0 | item 1 |
| 10 | 76.5:W | 5.0 | 7.3 | 1.2 | 10.0 | 100.0 | items 1–3 |
| 11 | 81.3 | 5.0 | 2.5 | 1.2 | 10.0 | 100.0 | items 1,2 |
| 12 | 68.8 | 5.0 | 15.0 | 1.2 | 10.0 | 100.0 | item 1 |
| 13 | 77.5 | 5.0 | 7.3 | 0.2 | 10.0 | 100.0 | items 1, 2 |
| 14 | 84.7 | 5.0 | 7.3 | 3.0 | 10.0 | 100.0 | items 1, 2 |
| 15 | 97.0 | 3.0 | 0.0 | 0.0 | 0.0 | 100.0 | items 1, 2 |
| 16 | 83.5 | 5.0 | 7.3 | 1.2 | 3.0 | 100.0 | items 1–3 |
| 17 | 82.5 | 5.0 | 1.0 | 1.2 | 10.0 | 100.0 | items 1, 2 |

Furthermore, during the production process described above, the metallic layer 11 of each ceramic member for bonding 1 produced was quantitatively analyzed to determine the contents of components. This quantitative analysis was made with an electron probe microanalyzer (accelerating voltage, 20 kV; spot diameter, 5 μm). The results are shown in Table 2 below.

With respect to each sample, the analysis was made on five points so as to reduce influences of segregation and the five found values obtained for each component were averaged. In Table 2, the contents of silicon, aluminum, calcium, and magnesium are given in terms of oxide amount.

TABLE 2

| Sample No. | Found value after sintering (average) [wt %] | | | | | | | | |
|---|---|---|---|---|---|---|---|---|---|
| | Mo | Ni | Mn | Ti | SiO₂ | Al₂O₃ | CaO | MgO | Total |
| 1 | 77.8 | 0.0 | 2.4 | 0.6 | 11.3 | 6.5 | 1.0 | 0.4 | 100.0 |
| 2 | 75.7 | 0.4 | 2.6 | 0.7 | 12.3 | 6.8 | 1.0 | 0.5 | 100.0 |
| 3 | 75.4 | 0.6 | 2.7 | 0.7 | 12.2 | 6.8 | 1.1 | 0.5 | 100.0 |
| 4 | 78.6 | 2.2 | 2.6 | 0.7 | 9.1 | 5.7 | 1.1 | 0.0 | 100.0 |
| 5 | 70.0 | 7.6 | 2.0 | 1.4 | 11.2 | 6.5 | 1.1 | 0.2 | 100.0 |
| 6 | 69.1 | 9.8 | 1.9 | 1.3 | 10.5 | 6.2 | 1.0 | 0.2 | 100.0 |
| 7 | 79.4 | 2.3 | 2.7 | 0.7 | 8.4 | 5.4 | 0.9 | 0.2 | 100.0 |
| 8 | 72.0 | 2.2 | 1.7 | 0.5 | 16.3 | 6.2 | 1.0 | 0.1 | 100.0 |
| 9 | 67.5 | 2.0 | 1.6 | 0.4 | 21.0 | 6.4 | 1.0 | 0.0 | 100.0 |
| 10 | 78.8 | 2.1 | 2.5 | 0.7 | 9.0 | 5.8 | 1.1 | 0.0 | 100.0 |
| 11 | 77.9 | 2.2 | 1.4 | 0.7 | 10.9 | 5.9 | 1.0 | 0.1 | 100.0 |
| 12 | 75.3 | 2.3 | 3.0 | 0.7 | 11.2 | 6.2 | 1.1 | 0.2 | 100.0 |
| 13 | 76.2 | 2.1 | 2.5 | 0.1 | 11.5 | 6.4 | 1.1 | 0.1 | 100.0 |
| 14 | 75.6 | 2.8 | 2.6 | 2.1 | 10.2 | 5.7 | 1.0 | 0.0 | 100.0 |
| 15 | 84.5 | 2.6 | 0.0 | 0.3 | 6.8 | 5.0 | 0.7 | 0.1 | 100.0 |
| 16 | 78.4 | 2.4 | 2.8 | 0.6 | 8.8 | 5.8 | 1.0 | 0.2 | 100.0 |
| 17 | 78.2 | 2.3 | 0.5 | 0.6 | 11.1 | 6.1 | 1.0 | 0.2 | 100.0 |

In producing sample No. 10, tungsten was used in place of molybdenum.

c) The bonded object samples produced by the process described above were examined for bonding strength.

Figure 3:
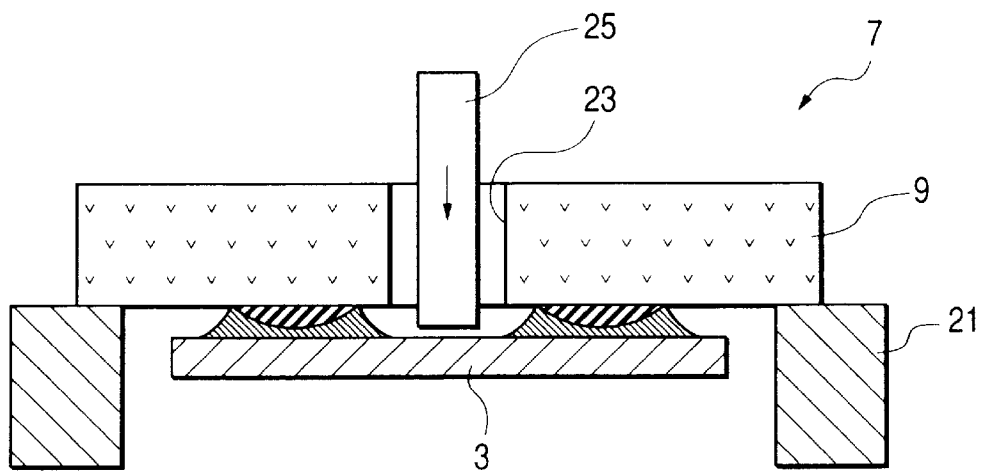
FIG. 3 is a view illustrating a method of measuring the bonding strength of the bonded object obtained in Example 1.

This examination was conducted in the following manner. As shown in FIG. 3, each bonded object 7 was placed so that the metallic member 3 faced downward and that the lower side of a peripheral part of the ceramic base 9 was supported on a cylindrical iron pedestal 21. A cylindrical punching rod 25 made of stainless steel was inserted from the upper side into the central through-hole 23 of the ceramic base 9 held in that state. The punching rod 25 was then moved downward at a rate of 0.5 mm/min.

The strength (breaking strength) at the time when the metallic member 3 separated from the ceramic base 9 was measured with a load cell (not shown) disposed over the punching rod 25. This strength was taken as brazing strength. With respect to each sample, the brazing strengths for the respective sintering temperatures are shown in the following Table 3.

TABLE 3

| Sample No. | Brazing strength [MPa] | | | | | Evaluation |
|---|---|---|---|---|---|---|
| | 1150° C. | 1200° C. | 1250° C. | 1300° C. | 1350° C. | |
| 1 | 4.9 | 8.0 | 9.7 | 16.7 | 18.6 | X |
| 2 | 6.9 | 12.7 | 11.8 | 6.9 | 4.9 | Δ |
| 3 | 11.8 | 17.6 | 14.7 | 7.8 | 3.9 | ○ |
| 4 | 17.6 | 19.6 | 15.7 | 6.9 | 3.9 | ○ |
| 5 | 17.6 | 18.6 | 14.7 | 6.9 | 2.9 | ○ |
| 6 | 12.7 | 12.7 | 10.8 | 5.9 | 2.9 | Δ |
| 7 | 9.8 | 15.4 | 13.3 | 4.9 | 3.9 | Δ |
| 8 | 14.7 | 17.6 | 15.7 | 6.9 | 3.9 | ○ |
| 9 | 10.8 | 14.7 | 11.8 | 3.9 | 2.9 | Δ |
| 10 | 16.9 | 19.1 | 16.0 | 5.9 | 2.9 | ○ |
| 11 | 15.3 | 14.1 | 10.9 | 5.9 | 3.9 | Δ |
| 12 | 12.8 | 14.0 | 11.0 | 6.9 | 3.9 | Δ |
| 13 | 13.7 | 15.6 | 11.8 | 5.7 | 4.2 | Δ |
| 14 | 15.2 | 14.5 | 10.2 | 6.0 | 4.3 | Δ |
| 15 | 10.3 | 14.6 | 15.7 | 6.9 | 3.9 | Δ |
| 16 | 12.8 | 17.2 | 15.6 | 5.9 | 3.9 | ○ |
| 17 | 14.5 | 13.6 | 10.1 | 5.7 | 2.9 | Δ |

In the column "Evaluation" in Table 3, ○ indicates that the sample had a peak not lower than 17 MPa in the range of from 1,150 to 1,2500° C., Δ indicates that the sample had a peak of from 10 to 17 MPa in that temperature range, and × indicates that the sample had no peak of 10 MPa or higher in that temperature range.

Table 3 shows the following. Samples Nos. 2 to 17, which are within the scope of the invention, advantageously have high brazing strengths because the metallic layers formed by metallization have sufficiently sintered even through low-temperature sintering. For example, these samples obtained through sintering at 1,150° C. each has a strength of 6.9 MPa or higher. Those bonded objects have an advantage that the cost of sintering is low because the sintering can be conducted at low temperatures. There also is an advantage that since the metallic layers in those samples can be sufficiently sintered at low temperatures, the ceramic members for bonding can retain high dimensional accuracy as compared with the case where sintering is conducted at high temperature.

In contrast, sample No. 1, as a comparative example, obtained through sintering at low temperatures disadvantageously has low brazing strengths because the metallic layer formed by metallization has not sufficiently sintered through such low-temperature sintering.

EXAMPLE 2

In Example 2, explanations on the same points as in Example 1 are omitted.

Figure 4:
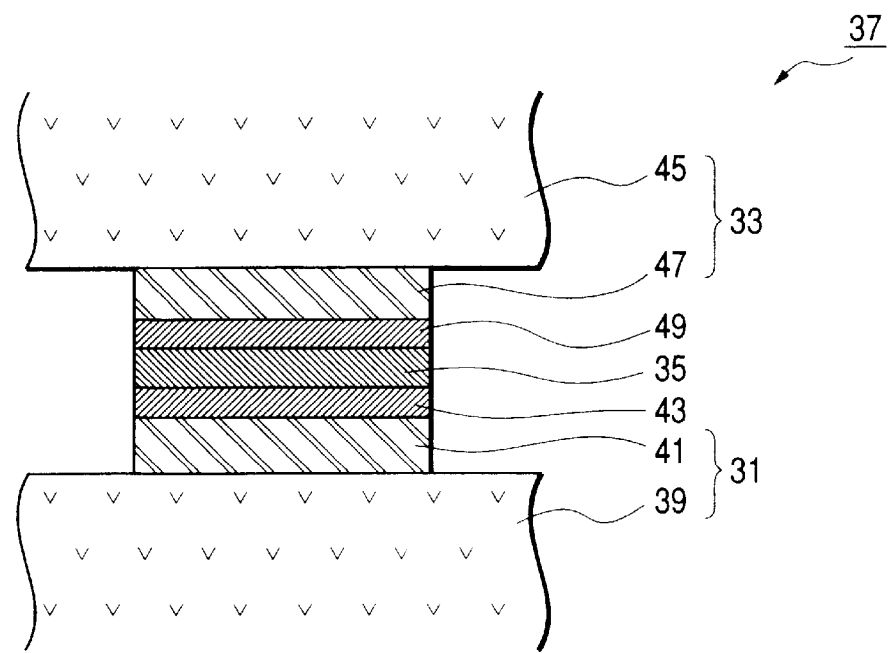
FIG. 4 is a sectional view illustrating an important part of a bonded object shown in Example 2.

In this Example, a bonded object comprising two ceramic members bonded to each other is described as an embodiment.

a) FIG. 4 diagrammatically shows this embodiment, which is a bonded object 37 comprising a first ceramic member for bonding 31 made of alumina and, bonded thereto with a brazing material 35, a second ceramic member for bonding 33 made of alumina and similar to the first ceramic member 31.

More specifically, the first ceramic member for bonding 31 comprises a first ceramic base 39 and a first metallic layer 41 formed thereon by metallization. A first deposit layer 43 has been formed on this first metallic layer 41 by nickel plating. On the other hand, the second ceramic member for bonding 33 comprises a second ceramic base 45 and a second metallic layer 47 formed thereon by metallization. A second deposit layer 49 has been formed on this second metallic layer 47 by nickel plating. The first ceramic member for bonding 31 and the second ceramic member for bonding 33 have been united with each other by bonding the first deposit layer 43 to the second deposit layer 49 with the brazing material 35.

b) A process for producing a ring-shaped test piece as an example of this bonded object will be explained below together with a process for producing ceramic members for bonding.

(1) Using particulate metallizing-ink ingredients shown in Table 1 given above, metallizing inks for respective samples were produced in the same manner as in Example 1 (hereinafter, the points on which explanation is omitted here are the same as in Example 1).

(2) Each of the metallizing inks thus produced was applied to a surface of a first ceramic base 39 and to a surface of a second ceramic base 45.

(3) Subsequently, the first and second ceramic bases 39 and 45 coated with the metallizing ink were placed in a furnace and sintered at temperatures in the range of from 1,150 to 1,350° C. to obtain first and second ceramic members for bonding 31 and 33.

(4) The surfaces of the first and second metallic layers 41 and 47 thus formed by metallization were nickel-plated to form first and second deposit layers 43 and 49.

(5) Thereafter, a silver brazing material 35 was interposed between the two deposit layers 43 and 49 to braze the ceramic members for bonding 31 and 33 together. Thus, the ceramic members 31 and 33 were united with each other to complete a bonded object. 37.

c) The bonded object samples (test pieces of sample Nos. 1 to 17) produced by the process described above were examined for bonding strength by the same method as in Example 1.

The results obtained are shown in Table 4 below.

TABLE 4

| Sample No. | Brazing strength [MPa] | | | | | Evaluation |
|---|---|---|---|---|---|---|
| | 1150° C. | 1200° C. | 1250° C. | 1300° C. | 1350° C. | |
| 1 | 16.6 | 28.5 | 37.8 | 58.8 | 63.7 | X |
| 2 | 24.5 | 47.0 | 38.0 | 26.5 | 20.6 | Δ |
| 3 | 47.0 | 63.7 | 60.8 | 32.3 | 14.7 | ○ |
| 4 | 60.8 | 66.6 | 63.7 | 27.4 | 15.7 | ○ |
| 5 | 62.7 | 63.0 | 60.8 | 26.5 | 9.8 | ○ |
| 6 | 46.8 | 44.0 | 34.1 | 22.5 | 11.8 | Δ |
| 7 | 32.3 | 52.2 | 46.1 | 20.6 | 15.7 | Δ |
| 8 | 56.8 | 62.7 | 62.7 | 27.4 | 14.7 | ○ |
| 9 | 41.1 | 44.7 | 35.1 | 16.7 | 10.8 | Δ |
| 10 | 58.9 | 64.3 | 63.5 | 25.1 | 13.3 | ○ |
| 11 | 59.4 | 59.6 | 45.3 | 23.8 | 11.2 | Δ |
| 12 | 44.3 | 48.7 | 40.2 | 26.2 | 10.4 | Δ |
| 13 | 58.8 | 58.6 | 48.4 | 28.4 | 8.4 | Δ |
| 14 | 58.2 | 56.1 | 51.2 | 21.4 | 10.1 | Δ |
| 15 | 40.1 | 48.7 | 53.8 | 26.2 | 10.2 | Δ |
| 16 | 51.2 | 62.4 | 58.4 | 27.8 | 11.3 | ○ |
| 17 | 56.3 | 54.1 | 49.6 | 21.8 | 9.7 | Δ |

In the column "Evaluation" in Table 4, ○ indicates that the sample had a peak not lower than 60 MPa in the range of from 1,150 to 1,250° C., Δ indicates that the sample had a peak of from 40 to 60 MPa in that temperature range, and × indicates that the sample had no peak of 40 MPa or higher in that temperature range.

Table 4 shows the following. Samples Nos. 2 to 17, which are within the scope of the invention, advantageously have high brazing strengths because the metallic layers formed by metallization have sufficiently sintered even through low-temperature sintering. Those bonded objects have an advantage that the cost of sintering is low because the sintering can be conducted at low temperatures. There also is an advantage that since the metallic layers in those samples can be sintered at low temperatures, the ceramic members for bonding can retain high dimensional accuracy as compared with the case where sintering is conducted at high temperature.

In contrast, sample No. 1, as a comparative example, obtained through sintering at low temperatures disadvantageously has low brazing strengths because the metallic layer formed by metallization has not sufficiently sintered through such low-temperature sintering.

EXAMPLE 3

In Example 3, explanations on the same points as in Examples 1 and 2 are omitted.

This Example describes application of a bonded object comprising a ceramic member for bonding and a metallic member, such as that shown in Example 1, to a vacuum switch as an embodiment.

This vacuum switch is a high-load switch which comprises a vacuum vessel having built-in electrodes and other components and is suitable for the switching of high-voltage large-current electricity.

Figure 5:
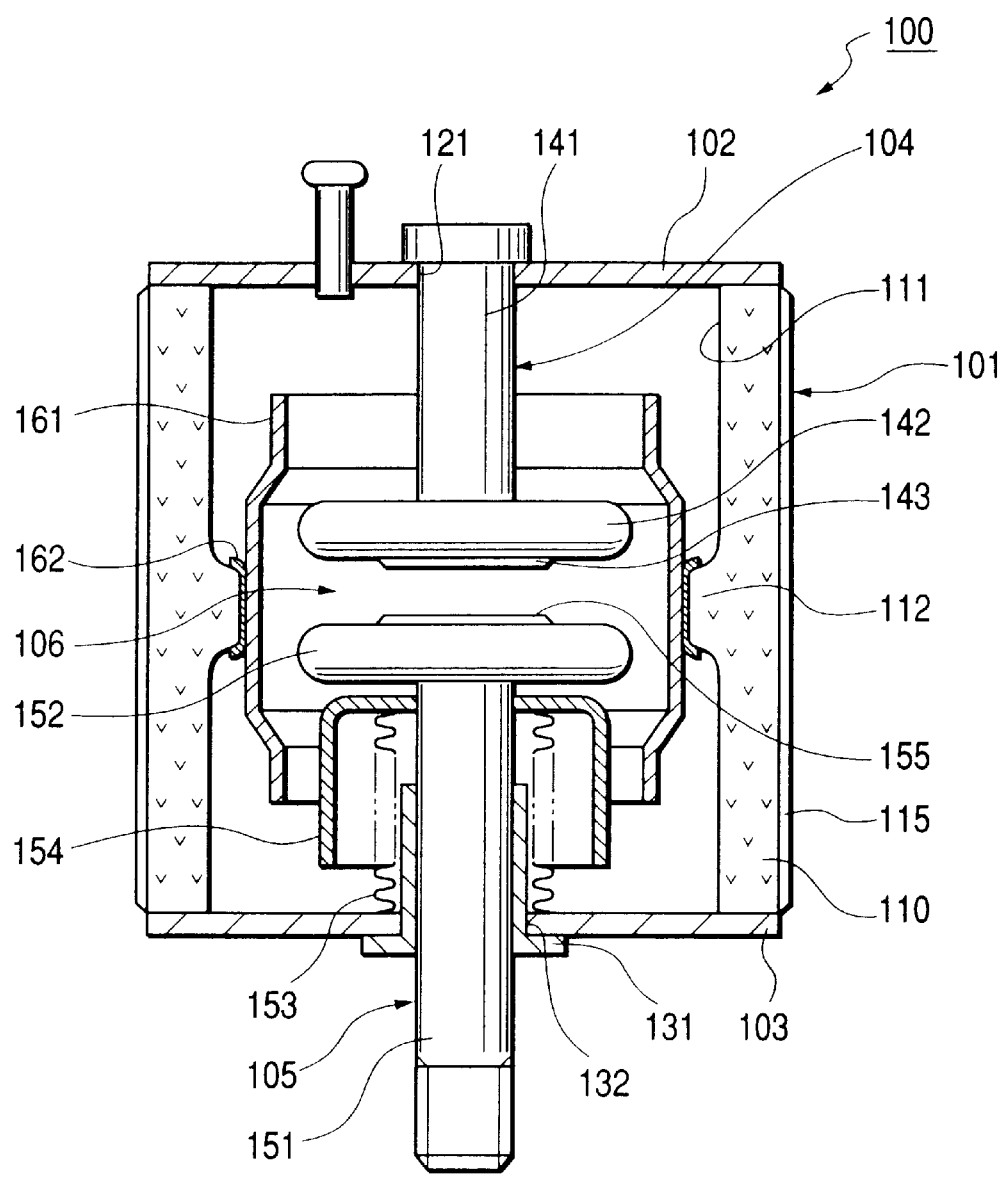
FIG. 5 is a partially cutaway view illustrating the vacuum switch shown in Example 3.

As shown in FIG. 5, this high-load vacuum switch 100 comprises an insulating valve 101, first and second end covers 102 and 103 attached to the insulating valve 101 so as to cover the respective ends thereof, a fixed electrode 104 attached to the first end cover 102 and projecting into the insulating valve 101, and a movable electrode 105 disposed so as to be freely slidable through the second end cover 103. The fixed electrode 104 and the movable electrode 105 constitute a contact point 106.

The insulating valve 101 is a sintered ceramic which has an alumina content of 92% by weight and has a nearly cylindrical shape having an inner diameter of 80 mm, a wall thickness of about 5 mm, and a length of 100 mm. The insulating valve 101 comprises a straight barrel part 110 having a constant inner diameter and a ridge part 112 projecting inward from the inner circumferential wall 111 and extending throughout the circumference along a circle located intermediately between both ends of the barrel part 110. The insulating valve 101 further has a glaze layer 115 on the outer circumferential surface thereof.

The first and second end covers 102 and 103 are constituted of disk-shaped Kovar (Fe-Ni-Co) plates respectively having in the centers thereof holes 121 and 132 for securing the fixed electrode 104 and a guide 131 thereto. This guide 131 has been disposed so that the movable shaft 151 of the movable electrode 105 is readily slidable.

The fixed electrode 104 consists of a fixed shaft 141, as one end thereof, which is firmly fitted to the hole 121 and a disk-shaped electrode 142, as the other end thereof, which projects into the insulating valve 101.

The movable electrode 105 consists of the movable shaft 151, as a rear end part thereof, which slides within the guide 131 and an electrode 152, as a front end part thereof, which comes into contact with the electrode 142 of the fixed electrode 104. This movable electrode 105 is equipped with a metallic bellows 153 extending from that part of the movable shaft 151 which is near the electrode 152 to the second end cover 103. The bellows 153 enables the electrode 105 to perform its switching function while maintaining a vacuum.

The metallic bellows 153 is surrounded by a bellows cover 154 so as to be prevented from coming into direct contact with a metal vapor generating from the electrodes 142 and 152 (i.e., contacts 143 and 155 disposed on the front ends thereof) upon current switching).

The contact point 106 has such a structure that fusion bonding caused by a vacuum arc generated is less apt to occur. This has been accomplished by employing a high-melting tungsten-based metal sinter as the material of the contacts 143 and 155 where the electrodes 142 and 152 contact with each other.

Furthermore, an arc shield 161 is disposed so as to surround the contact point 106. This arc shield 161 has been bonded by brazing to the ridge part 112 of the insulating valve 101 in order to prevent the metal vapor from depositing on the inner circumferential wall 111 of the insulating valve 101 to reduce insulation.

Namely, like the bonded object of Example 1, the high-load switch 100 of this Example comprises the insulating valve 101, which is a ceramic member for bonding, and the arc shield 161, which is a metallic member, bonded by brazing with a brazing material 162 to the ridge part 112 of the insulating valve 101.

Figure 6:
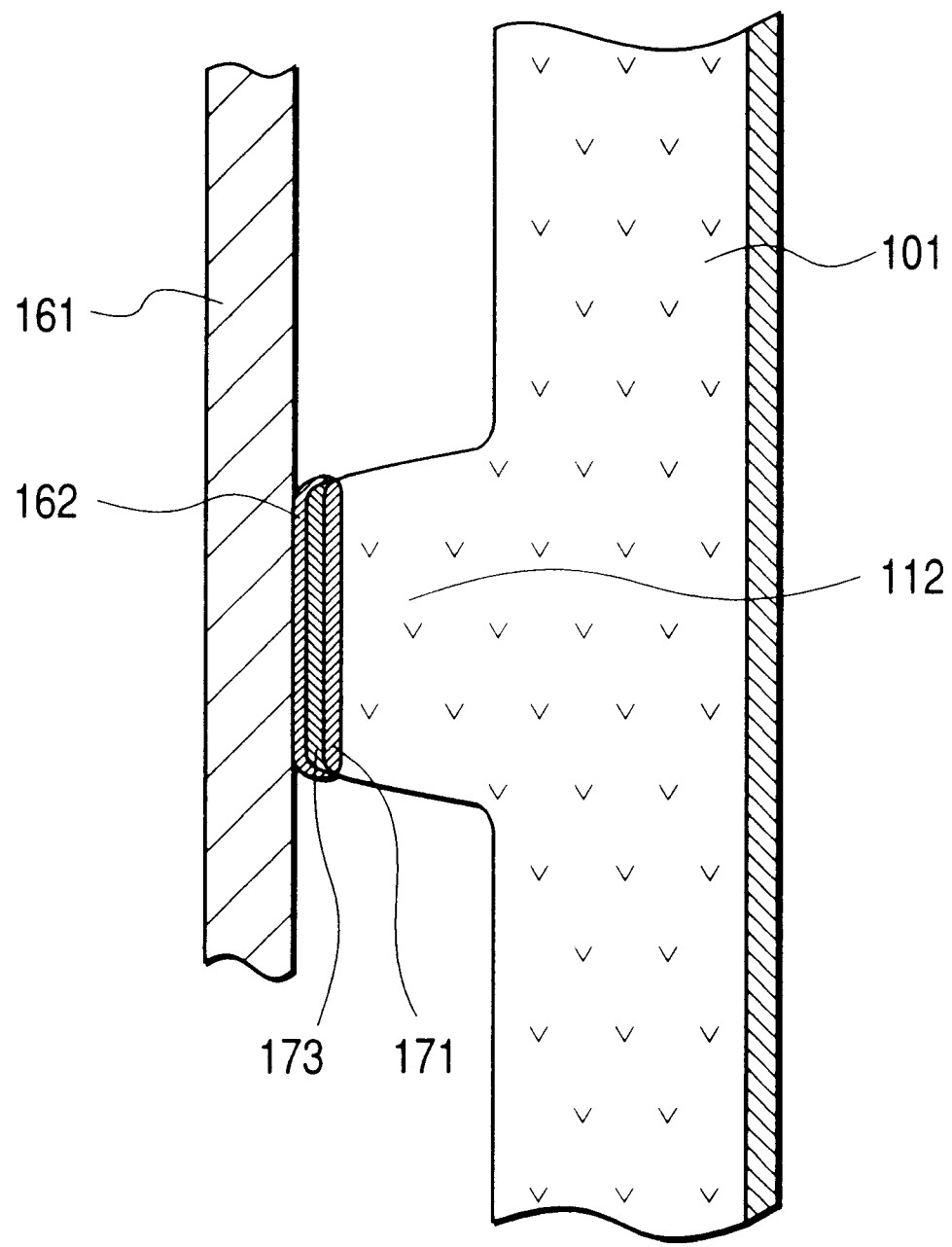
FIG. 6 is a sectional view illustrating an important part of the vacuum switch shown in Example 3.

FIG. 6 diagrammatically illustrates an important part of the switch 100. Specifically, the ridge part 112 of the insulating valve 101 has a metallic layer 171 formed on the top thereof by low-temperature metallization in the same manner as in Example 1. This metallic layer 171 is coated with a deposit layer 173 formed by nickel plating. This deposit layer 173 has been bonded to the arc shield 161 by brazing with the brazing material 162.

Thus, the insulating valve 101 equipped with the arc shield 161 (and hence the high-load switch 100) can be produced at low cost, and high dimensional accuracy and high bonding strength can be realized.

EXAMPLE 4

In Example 4, explanations on the same points as in Example 3 are omitted.

This Example describes application of a bonded object comprising a ceramic member for bonding and a metallic member to a vacuum switch as in Example 3. However, this vacuum switch differs from that of Example 3 in the structure of the arc shield and the insulating valve.

Figure 7:
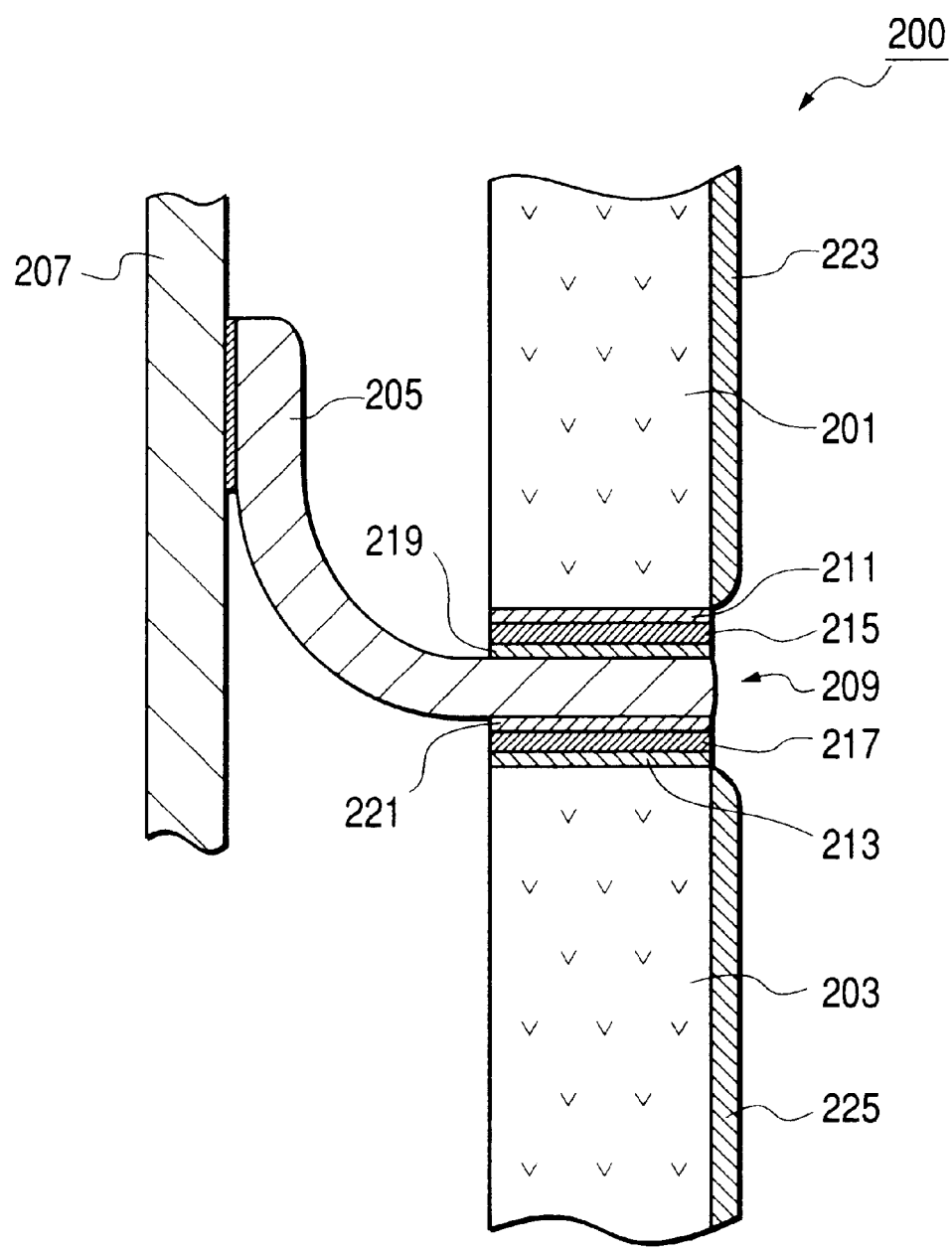
FIG. 7 is a sectional view illustrating an important part of the vacuum switch shown in Example 4.

An important part of the vacuum switch is diagrammatically shown in FIG. 7. This vacuum switch (high-load switch) 200 has a connecting member 205 made of oxygen-free copper interposed by brazing between an upper insulating valve 201 and a lower insulating valve 203, and further has an arc shield 207 bonded by brazing to the front end of the connecting member 205.

In particular, in the part (fixing part 209) where the upper insulating valve 201 and lower insulating valve 203 are fixed to the connecting member 205, the upper and lower insulating valves 201 and 203 respectively have metallic layers 211 and 213 formed thereon by metallization in the same manner as in Example 1. These metallic layers 211 and 213 are coated with deposit layers 215 and 217, respectively, formed by nickel plating.

These deposit layers 215 and 217 have been bonded to the connecting member 205 with brazing materials 219 and 221, respectively. Thus, the two insulating valves 201 and 203 have been united with the connecting member 205.

The two insulating valves 201 and 203 have, on the outer circumferential surfaces thereof, glaze layers 223 and 225, respectively, which are the same as the glaze layer in Example 3.

This Example brings about the same effects as Example 3.

The invention should not be construed as being limited to the Examples give above in any way. It is a matter of course that the invention can be practiced in various modes unless these modes depart from the spirit of the invention.

As described above in detail, in the process for producing a ceramic member for bonding of item 1 according to the invention, a metallic layer formed by metallization can be sufficiently sintered at low temperatures. Consequently, the sintering cost regarding furnace structure, utilities, expendable heat-resistant materials, etc. can be reduced as compared with conventional ones. Furthermore, high dimensional accuracy and high bonding strength can be realized.

The ceramic member for bonding of item 4 according to the invention has a metallic layer formed by metallization which has undergone sufficient sintering even through low-temperature sintering. Consequently, this ceramic member is effective in reducing the sintering cost and has high dimensional accuracy and high bonding strength as in item 1.

Furthermore, the bonded objects of items 7 and 8 likewise have advantages of cost reduction, high bonding strength, and high dimensional accuracy because they have the ceramic member for bonding described above.

Moreover, the vacuum switch of item 9 according to the invention and the vaccum vessel of item 10 according to the invention likewise have advantages of cost reduction, high bonding strength, and high dimensional accuracy because they comprise a bonded object having the ceramic member for bonding described above.

EXAMPLE 5

Figure 8:
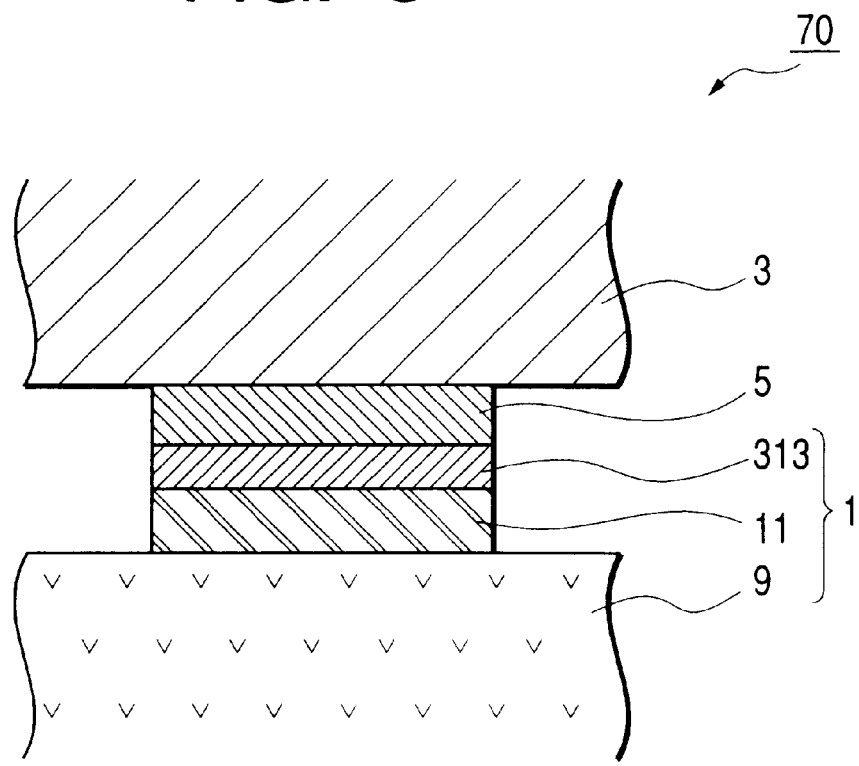
FIG. 8 is a sectional view illustrating an important part of a bonded object shown in Example 5.

A bonded object comprising a ceramic member for bonding and a metallic member is described as an embodiment.

a) FIG. 8 diagrammatically shows this embodiment, which is a bonded object 70 comprising a ceramic member for bonding 1 and a metallic member 3 bonded thereto with a brazing material 5.

More specifically, the ceramic member for bonding 1 comprises a ceramic base 9, a metallic layer (lower layer) 11 formed thereon by metallization, and an alloy layer (upper layer) 313 formed on the layer formed by metallization 11. The alloy layer 313 and the metallic member 3 have been bonded to each other with the brazing material 5, whereby the ceramic member for bonding 1 and the metallic member 3 have been united with each other.

In particular, in this embodiment, the layer formed by metallization 11 comprises from 71 to 88% by weight molybdenum, from 0.7 to 5.5% by weight nickel, and from 3 to 18% by weight $SiO_2$ in terms of silicon oxide amount, while the alloy layer 313 comprises from 36 to 61.3% by weight nickel and from 33 to 60% by weight copper (or from 2 to 30% by weight manganese).

Consequently, this bonded object 70 shown as an embodiment not only has high strength of bonding between the ceramic base 9 and the layer formed by metallization 11 but has excellent airtightness, as will be demonstrated by the experiment given later.

Furthermore, the ceramic member 1 and the metallic member 3 can be brazed together through the alloy layer 313 without conducting a post-treatment such as plating as in conventional processes. Consequently, a considerable simplification in production process can be attained.

b) A process for producing a ring-shaped test piece as an example of this bonded object 70 will be explained below together with a process for producing a ceramic member for bonding 1.

(1) First, a first paste (first metallizing ink) was produced by preparing a first mixture consisting of molybdenum particles, nickel particles, and $SiO_2$ particles in a proportion shown in Table 5 below, pulverizing and mixing the first mixture of particles, and mixing the first mixture (e.g., 87% by weight) with an organic binder (e.g., 13% by weight) such as, e.g., Ethyl cellulose.

(2) A second paste (second metallizing ink) was produced in the same manner by preparing a second mixture consisting of two or more members selected from nickel particles, copper particles, manganese particles, molybdenum particles, nickel-copper alloy particles, and nickel-manganese alloy particles as shown in Table 5 below, pulverizing and mixing the second mixture of particles, and mixing the second mixture (e.g., 87% by weight) with an organic binder (e.g., 13% by weight) such as, e.g., Ethyl cellulose.

(3) The first paste was applied to an alumina-based ceramic base 9 (e.g., 92% by weight alumina) which was a sintered ceramic (e.g., a ring-shaped test piece having a thickness of 5 mm, an outer diameter of 30 mm, and an inner diameter of 8.5 mm) in a thickness of about from 10 to 20 $\mu$m. The coating layer was dried to form a first layer (which will become a metallic layer 11 through metallization).

(4) Subsequently, the second paste was applied to the whole surface of the first layer in a thickness of about from 10 to 20 $\mu$m, and the coating layer was dried to form a second layer (which will become an alloy layer 313).

(5) The ceramic base 9 thus coated with the first layer and the second layer was placed in a furnace and sintered at the temperatures of from 1,050 to 1,200° C. shown in Table 7 in an atmosphere of $H_2/N_2$ (1:1) forming gas having a wetter temperature of 50° C. Thus, a ceramic member for bonding 1 was obtained which consisted of the ceramic base 9, a metallic layer 11 formed thereon by metallization, and an alloy layer 313 formed thereon.

(6) Thereafter, the ceramic member for bonding 1 and a metallic member 3 made of Kovar (Fe-Ni-Co) were brazed together.

Specifically, a foil of a silver brazing material (BAg-8) 5 was interposed between the alloy layer 313 and the metallic member 3 (e.g., a Kovar disk having a thickness of 1 mm and an outer diameter of 16 mm). This assemblage was heated at a given brazing temperature and then cooled to braze the ceramic member for bonding 1 and the metallic member 3 together. Thus, a bonded object 70 was completed.

Figure 9:
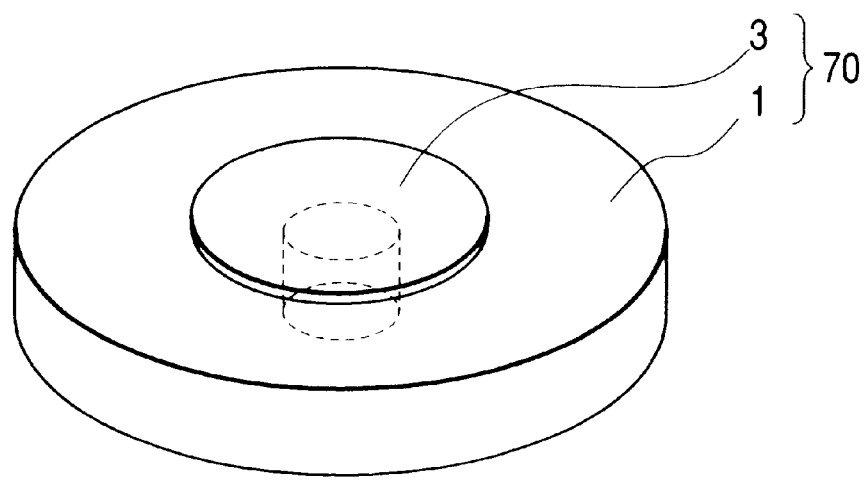
FIG. 9 is a slant view illustrating a bonded object obtained in Example 5.

Using the first and second pastes having different compositions as shown in Table 5 below, ring-shaped test pieces (samples) Nos. 101 to 110 and 115 to 120 as shown in FIG. 9 were produced, as bonded objects 70 to be tested, through the steps (1) to (6) described above.

Samples Nos. 111 to 114 as comparative examples were further produced using pastes differing in those first and second pastes in composition.

TABLE 5

| Sample No. | First paste (for layer formed by metallization) | | | Second paste (for alloy layer) | | | |
|---|---|---|---|---|---|---|---|
| | Mo | Ni | SiO₂ | Ni | Cu | Mn | Mo |
| Example | | | | | | | |
| 101 | 92 | 3 | 5 | 30 | 70 | — | — |
| 102 | 92 | 3 | 5 | 40 | 60 | — | — |
| 103 | 92 | 3 | 5 | 50 | 50 | — | — |
| 104 | 92 | 3 | 5 | 70 | 30 | — | — |
| 105 | 92 | 3 | 5 | 80 | 20 | — | — |
| 106 | 92 | 3 | 5 | 30 | — | 70 | — |
| 107 | 92 | 3 | 5 | 40 | — | 60 | — |
| 108 | 92 | 3 | 5 | 50 | — | 50 | — |
| 109 | 92 | 3 | 5 | 70 | — | 30 | — |
| 110 | 92 | 3 | 5 | 80 | — | 20 | — |
| Comparative Example | | | | | | | |
| 111 | 92 | 3 | 5 | 30 | — | — | 70 |
| 112 | 92 | 3 | 5 | 50 | — | — | 50 |
| 113 | 92 | 3 | 5 | 70 | — | — | 30 |
| 114 | 92 | 3 | 5 | 100 | — | — | — |
| Example | | | | | | | |
| 115 | 94.5 | 0.5 | 5 | 50 | 50 | — | — |
| 116 | 94 | 1 | 5 | 50 | 50 | — | — |
| 117 | 85 | 10 | 5 | 50 | 50 | — | — |
| 118 | 98 | 1 | 1 | 50 | 50 | — | — |
| 119 | 65 | 10 | 25 | 50 | 50 | — | — |
| 120 | 70 | 10 | 20 | 50 | 50 | — | — |

Furthermore, a section of each ceramic member for bonding 1 produced was polished, and the layer formed by metallization 11 and the alloy layer 313 were quantitatively analyzed to determine the contents of components. This quantitative analysis was made with an electron probe microanalyzer (accelerating voltage, 20 kV; spot diameter, 5 μm). The results obtained are shown in Table 6 below.

With respect to each simple, the analysis was made on five points so as to reduce influences of segregation and the five found values for each component were averaged. In Table 6, the content of silicon is given in terms of oxide amount.

In each layer, the remainder is accounted for by glass ingredients, such as $Al_2O_3$, MgO, and CaO, which have come into the layer from the ceramic base by diffusion.

TABLE 6

| Sample No. | Found value after sintering (average) [wt %] | | | | | | |
|---|---|---|---|---|---|---|---|
| | Layer formed by metallization (layer layer) | | | Alloy layer (upper layer) | | | |
| | Mo | Ni | SiO₂ | Ni | Cu | Mn | Mo |
| Example | | | | | | | |
| 101 | 91.3 | 0.5 | 4.7 | 29.2 | 68.3 | — | 1.0 |
| 102 | 85.8 | 0.9 | 5.8 | 37.7 | 56.3 | — | 1.4 |
| 103 | 90.0 | 2.2 | 3.1 | 45.1 | 46.2 | — | 3.8 |
| 104 | 90.2 | 2.8 | 3.0 | 58.1 | 35.4 | — | 4.3 |
| 105 | 89.7 | 3.2 | 4.2 | 61.4 | 30.5 | — | 5.1 |
| 106 | 89.0 | 1.2 | 4.3 | 35.3 | — | 34.8 | 21.1 |
| 107 | 89.4 | 1.3 | 4.0 | 43.3 | — | 26.1 | 18.5 |
| 108 | 87.5 | 1.6 | 4.2 | 52.3 | — | 19.7 | 19.7 |
| 109 | 88.0 | 1.5 | 4.6 | 61.1 | — | 2.5 | 30.5 |
| 110 | 85.3 | 2.9 | 4.7 | 80.4 | — | 0.9 | 9.7 |

TABLE 6-continued

| Sample No. | Found value after sintering (average) [wt %] | | | | | | |
|---|---|---|---|---|---|---|---|
| | Layer formed by metallization (layer layer) | | | Alloy layer (upper layer) | | | |
| | Mo | Ni | SiO₂ | Ni | Cu | Mn | Mo |
| Comparative Example | | | | | | | |
| 111 | 87.4 | 2.7 | 4.8 | 25.3 | — | — | 67.8 |
| 112 | 87.5 | 3.2 | 3.7 | 43.3 | — | — | 51.5 |
| 113 | 87.0 | 4.0 | 3.9 | 60.8 | — | — | 33.5 |
| 114 | 86.8 | 4.3 | 3.8 | 89.1 | — | — | 3.5 |
| Example | | | | | | | |
| 115 | 88.8 | 0.7 | 4.8 | 46.2 | 47.3 | — | 4.0 |
| 116 | 86.7 | 1.4 | 4.2 | 46.7 | 47.1 | — | 4.0 |
| 117 | 84.7 | 5.3 | 3.2 | 47.2 | 47.0 | — | 3.7 |
| 118 | 93.3 | 1.3 | 3.3 | 45.3 | 46.4 | — | 4.2 |
| 119 | 70.1 | 4.1 | 19.2 | 44.8 | 46.8 | — | 2.8 |
| 120 | 71.3 | 4.5 | 16.7 | 46.5 | 47.2 | — | 3.5 | c) The samples of the bonded object 70 produced by the process described above were examined for bonding strength.

Figure 10:
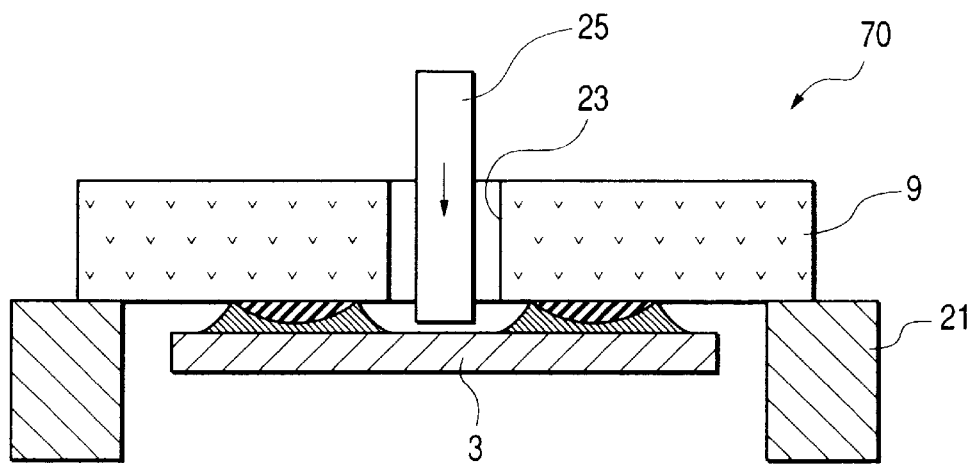
FIG. 10 is a view illustrating a method of measuring the bonding strength of the bonded object obtained in Example 5.

This examination was conducted in the following manner. As shown in FIG. 10, each bonded object 70 was placed so that the metallic member 3 faced downward and that the lower side of a peripheral part of the ceramic base 9 was supported on a cylindrical iron pedestal 21. A cylindrical punching rod 25 made of stainless steel was inserted from the upper side into the central through-hole 23 of the ceramic base 9 held in that state. The punching rod 25 was then moved downward at a rate of 0.5 mm/min.

The strength (breaking strength) at the time when the metallic member 3 separated from the ceramic base 9 was measured with a load cell (not shown) disposed over the punching rod 25. This strength was taken as brazing strength. With respect to each sample, the evaluation of the brazing strengths (bonding strengths) for the respective sintering temperatures are shown in the following Table 7.

In the column "Evaluation" in Table 7 ○ indicates that the sample had a bonding strength higher than 17 MPa in the range of from 1,050 to 1,200° C., Δ indicates that the sample had a bonding strength of from 11 to 17 MPa in that temperature range, and × indicates that the sample had a bonding strength lower than 11 MPa in that temperature range.

TABLE 7

| Sample No. | Evaluation of bonding strength Sintering temperature [° C.] | | | |
|---|---|---|---|---|
| | 1050 | 1100 | 1150 | 1200 |
| Example | | | | |
| 101 | X | Δ | ○ | X |
| 102 | X | ○k | ○k | X |
| 103 | X | ○k | ○k | X |
| 104 | Δ | ○k | ○k | X |
| 105 | X | ○k | Δ | X |
| 106 | X | ○ | X | X |
| 107 | X | ○k | ○ | X |
| 108 | X | ○k | ○k | X |
| 109 | X | ○k | ○k | X |
| 110 | X | ○ | Δ | X |

TABLE 7-continued

| | Evaluation of bonding strength Sintering temperature [° C.] | | | |
|---|---|---|---|---|
| | 1050 | 1100 | 1150 | 1200 |
| Comparative Example | | | | |
| 111 | X | X | Δ | X |
| 112 | X | X | Δ | Δ |
| 113 | X | X | Δ | X |
| 114 | X | X | Δ | X |
| Example | | | | |
| 115 | X | Δ | Ok | Δ |
| 116 | X | Ok | Ok | X |
| 117 | X | Ok | Ok | X |
| 118 | X | Δk | Ok | Δ |
| 119 | Δ | Ok | Δk | X |
| 120 | Δ | Ok | Ok | X |

Table 7 shows the following. Samples Nos. 101 to 110 and 115 to 120 according to the invention advantageously have high brazing strengths because the metallic layers formed by metallization have sufficiently sintered even through low-temperature sintering. Those bonded objects have an advantage that the cost of sintering is low because the sintering can be conducted at low temperatures. There also is an advantage that since the metallic layers in those samples can be sufficiently sintered at low temperatures, the ceramic members for bonding can retain high dimensional accuracy as compared with the case where sintering is conducted at high temperatures.

In particular, samples Nos. 102 to 104, 107 to 109, 116, 117, and 120, which satisfy the requirements given in items 12 and 16 of the invention (i.e., the samples of which the evaluation of bonding strength in Table 7 of "O" for at least two of the sintering temperatures), have high bonding strengths and are more preferred.

In contrast, samples Nos. 111 to 114, as comparative examples, disadvantageously have low brazing strengths.

d) Subsequently, the samples of the bonded object 70 produced by the process described above were examined for airtightness.

Specifically, one side of the bonded object 70 shown in FIG. 8 was made vacuum ($1=10^{-8}$ Torr or lower) and the other side was filled with helium to examine the bonded object 70 for helium leakage.

The results obtained are shown in Table 7 by means of symbol "k".

As apparent from Table 7, samples Nos. 102 to 105, 107 to 109, and 115 to 120 according to the invention have especially high airtightness.

EXAMPLE 6

In Example 6, explanations on the same points as in Example 5 are omitted.

Figure 11:
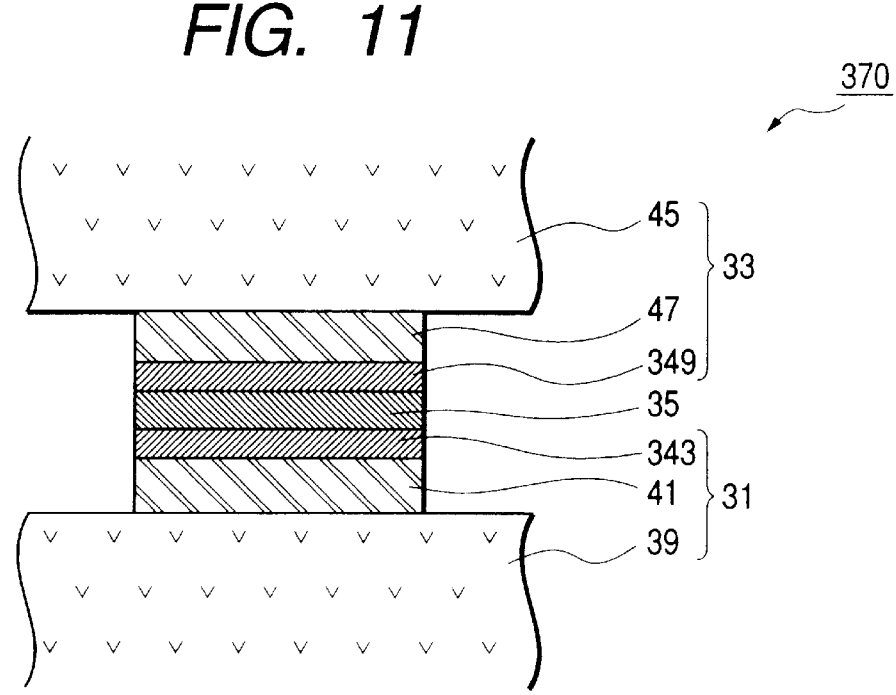
FIG. 11 is a sectional view illustrating an important part of a bonded object shown in Example 6.

In this Example, a bonded object comprising two ceramic members bonded to each other is described as an embodiment.

a) FIG. 11 diagrammatically shows this embodiment, which is a bonded object 370 comprising a first ceramic member for bonding 31 made of alumina and, bonded thereto with a brazing material 35, a second ceramic member for bonding 33 made of alumina and similar to the first ceramic member 31.

More specifically, the first ceramic member for bonding 31 comprises a first ceramic base 39, a first metallic layer 41 formed thereon by metallization, and a first alloy layer 343 formed on this first metallic layer 41. On the other hand, the second ceramic member for bonding 33 comprises a second ceramic base 45, a second metallic layer 47 formed thereon by metallization, and a second alloy layer 349 formed on this second metallic layer 47.

The first ceramic member for bonding 31 and the second ceramic member for bonding 33 have been united with each other by bonding the first alloy layer 343 to the second alloy layer 349 with the brazing material 35.

b) A process for producing this bonded object 370 will be explained below together with a process for producing the first and second ceramic members for bonding 31 and 33.

(1) Using particulate ingredients shown in Table 5 as first-paste and second-paste ingredients, a first paste and a second paste for each sample were produced in the same manner as in Example 5 (hereinafter, the points on which explanation is omitted here are the same as in Example 5).

(2) The first paste was applied to a surface of each of first and second ceramic bases 39 and 45 and then dried to form respective first layers.

(3) Subsequently, the second paste was applied to the surface of the first layer of each of the first and second ceramic bases 39 and 45 and then dried to form respective second layers.

(4) Thereafter, the first and second ceramic bases 39 and 45 each coated with the first layer and the second layer were placed in a furnace and sintered at temperatures in the range of from 1,050 to 1,200° C. Thus, a first ceramic member for bonding 31 having a first layer formed by metallization 41 and a first alloy layer 343 superposed thereon and a second ceramic member for bonding 33 having a second layer formed by metallization 47 and a second alloy layer 349 superposed thereon were obtained.

(5) Subsequently, a silver brazing material 35 was interposed between the two alloy layers 343 to 349 to braze the ceramic members for bonding 31 and 33 together. Thus, the ceramic members 31 and 33 were united with each other to complete a bonded object 370.

This bonded object 370 shown as an embodiment has high bonding strength and excellent air tightness like the bonded object shown in Example 5.

EXAMPLE 7

In Example 7, explanations on the same points as in Examples 5 and 6 are omitted.

This Example describes application of a bonded object comprising a ceramic member for bonding and a metallic member, such as that shown in Example 5, to a vacuum switch as an embodiment.

This vacuum switch is a high-load switch which comprises a vacuum vessel having built-in electrodes and other components and is suitable for the switching of high-voltage large-current electricity.

Figure 12:
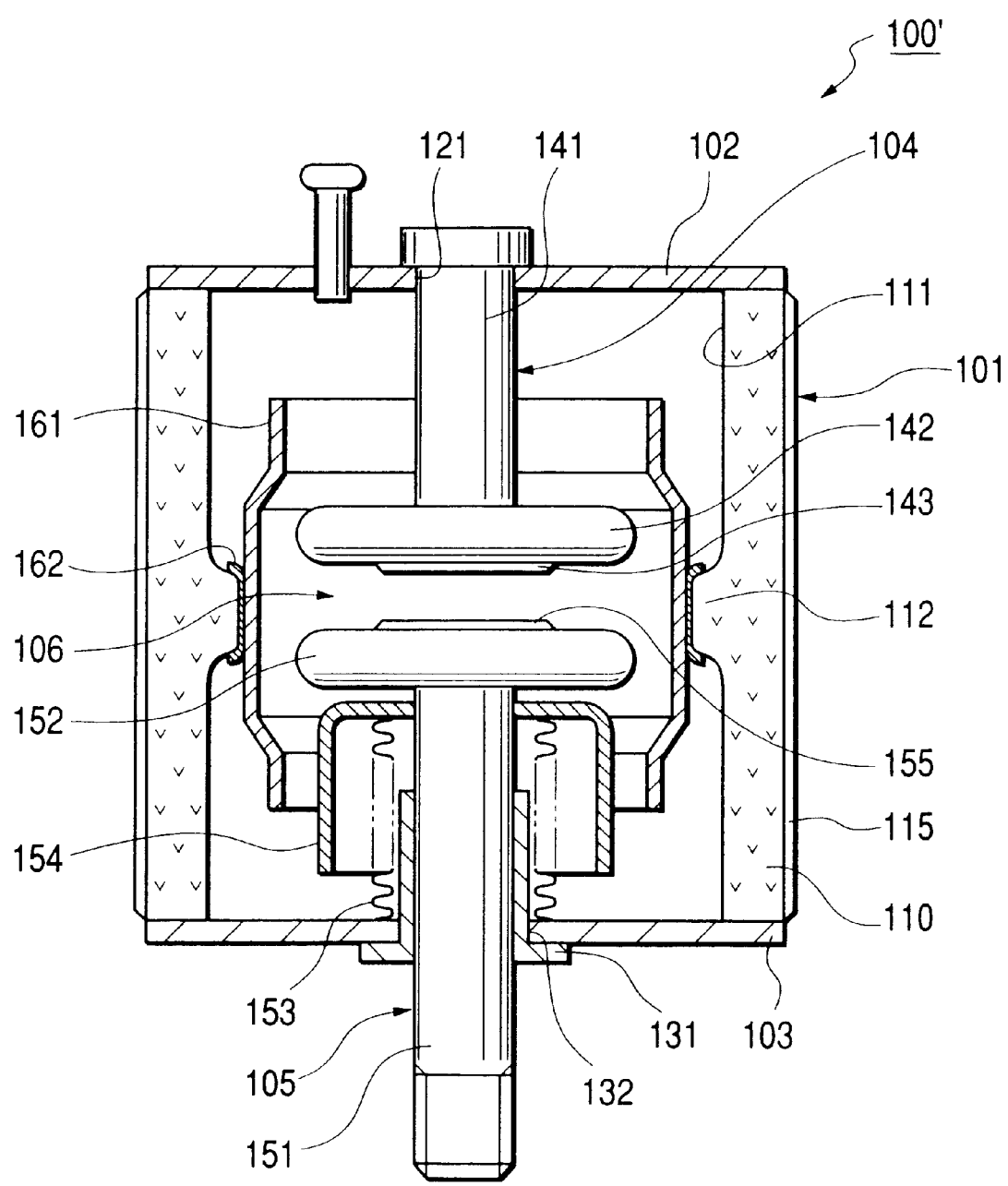
FIG. 12 is a partially cutaway view illustrating the vacuum switch shown in Example 7.

As shown in FIG. 12, this high-load vacuum switch 100' comprises an insulating valve 101, first and second end covers 102 and 103 attached to the insulating valve 101 so as to cover the respective ends thereof, a fixed electrode 104 attached to the first end cover 102 and projecting into the insulating valve 101, and a movable electrode 105 disposed so as to be freely slidable through the second end cover 103. The fixed electrode 104 and the movable electrode 105 constitutes a contact point 106.

The insulating valve 101 is a sintered ceramic which has an alumina content of 92% by weight and has a nearly cylindrical shape having an inner diameter of 80 mm, a wall thickness of about 5 mm, and a length of 100 mm. The insulating valve 101 comprises a straight barrel part 110 having a constant inner diameter and a ridge part 112 projecting inward from the inner circumferential wall 111 and extending throughout the circumference along a circle located intermediately between both ends of the barrel part 110. The insulating valve 101 further has a glaze layer 115 on the outer circumferential surface thereof.

The first and second end covers 102 and 103 are constituted of disk-shaped Kovar (Fe—Ni—Co) plates respectively having in the centers thereof holes 121 and 132 for securing the fixed electrode 104 and a guide 131 thereto. This guide 131 has been disposed so that the movable shaft 151 of the movable electrode 105 is readily slidable.

The fixed electrode 104 consists of a fixed shaft 141, as one end thereof, which is firmly fitted to the hole 121 and a disk-shaped electrode 142, as the other end thereof, which projects into the insulating valve 101.

The movable electrode 105 consists of the movable shaft 151, as a rear end part thereof, which slides within the guide 131 and an electrode 152, as a front end part thereof, which comes into contact with the electrode 142 of the fixed electrode 104. This movable electrode 105 is equipped with a metallic bellows 153 extending from that part of the movable shaft 151 which is near the electrode 152 to the second end cover 103. The bellows 153 enables the electrode 105 to perform its switching function while maintaining a vacuum.

The metallic bellows 153 is surrounded by a bellows cover 154 so as to be prevented from coming into direct contact with a metal vapor generating from the electrodes 142 and 152 (i.e., contacts 143 and 155 disposed on the front ends thereof) upon current switching.

The contact point 106 has such a structure that fusion bonding caused by a vacuum arc generated is less apt to occur. This has been accomplished by employing a high-melting tungsten-based metal sinter as the material of the contacts 143 and 155 where the electrodes 142 and 152 contact with each other.

Furthermore, an arc shield 161 is disposed so as to surround the contact point 106. This arc shield 161 has been bonded by brazing to the ridge part 112 of the insulating valve 101 in order to prevent the metal vapor from depositing on the inner circumferential wall 111 of the insulating valve 101 to reduce insulation.

Namely, like the bonded object of Example 5, the high-load switch 100' of this Example comprises the insulating valve 101, which is a ceramic member for bonding, and the arc shield 161, which is a metallic member, bonded by brazing with a brazing material 162 to the ridge part 112 of the insulating valve 101.

Figure 13:
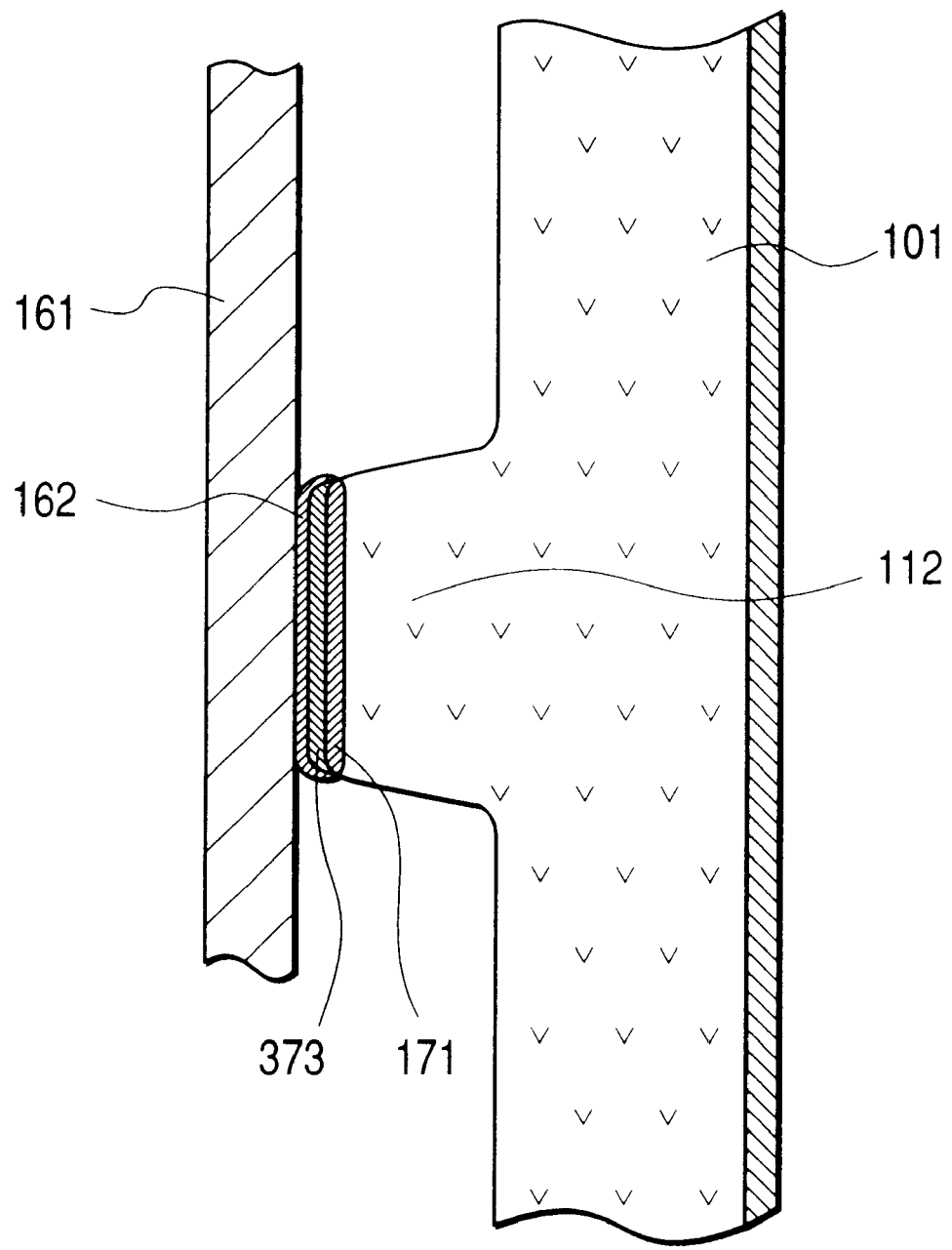
FIG. 13 is a sectional view illustrating an important part of the vacuum switch shown in Example 7.

FIG. 13 diagrammatically illustrates an important part of the switch 100'. Specifically, the ridge part 112 of the insulating valve 101 has a metallic layer 171 formed on the top thereof by low-temperature metallization in the same manner as in Example 5. This layer formed by metallization 171 is coated with an alloy layer 373. This alloy layer 373 has been bonded to the arc shield 161 by brazing with the brazing material 162.

Thus, the insulating valve 101 equipped with the arc shield 161 (and hence the high-load switch 100') can be produced at low cost, and high dimensional accuracy and high bonding strength can be realized.

EXAMPLE 8

In Example 8, explanations on the same points as in Example 7 are omitted.

This Example describes application of a bonded object comprising a ceramic member for bonding and a metallic member to a vacuum switch as in Example 7. However, this vacuum switch differs from that of Example 7 in the structure of the arc shield and the insulating valve.

Figure 14:
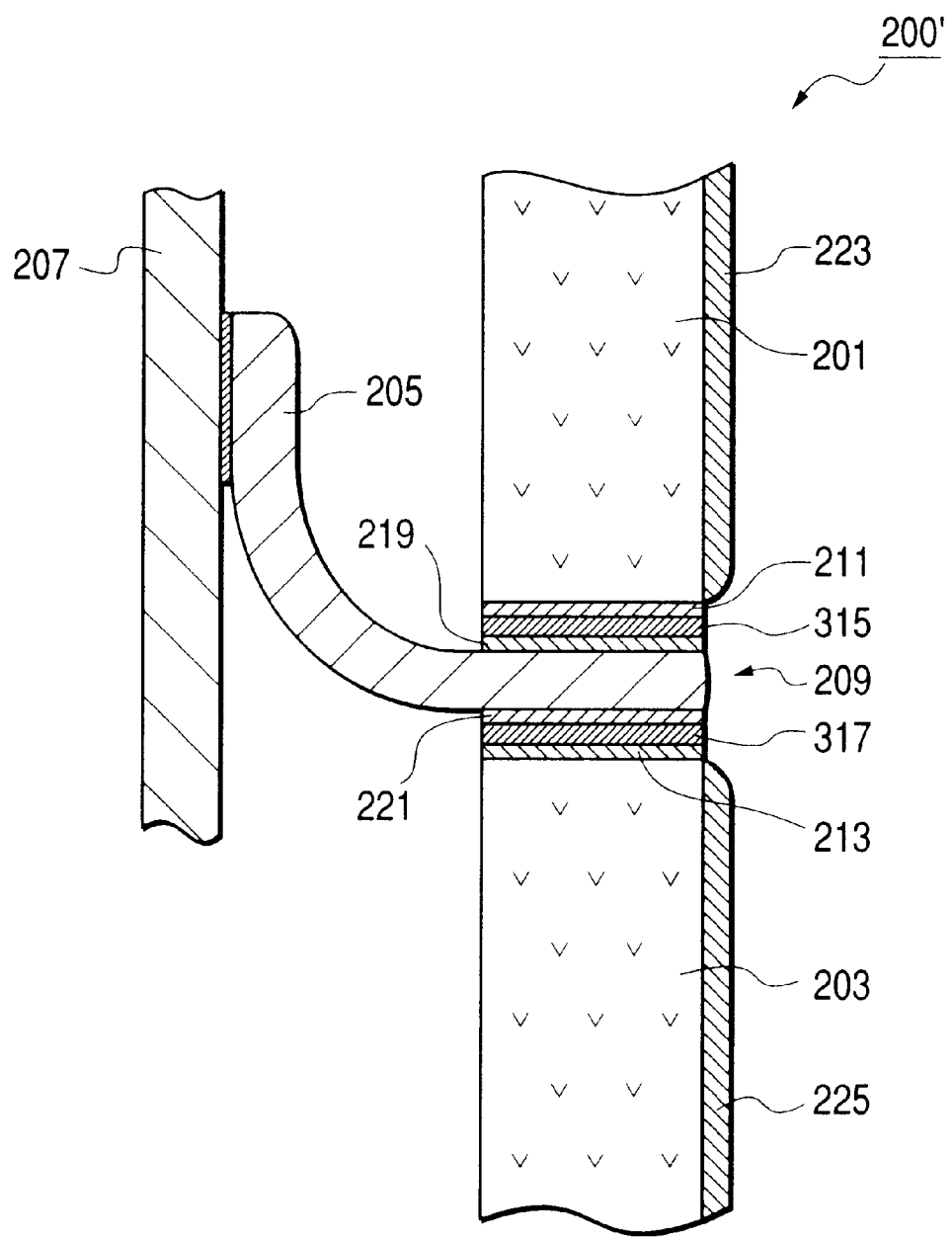
FIG. 14 is a sectional view illustrating an important part of the vacuum switch shown in Example 8.

An important part of the vacuum switch is diagrammatically shown in FIG. 14. This vacuum switch (high-load switch) 200' has a connecting member 205 made of oxygen-free copper interposed by brazing between an upper insulating valve 201 and a lower insulating valve 203, and further has an arc shield 207 bonded by brazing to the front end of the connecting member 205.

In particular, in the part (fixing part 209) where the upper insulating valve 201 and lower insulating valve 203 are fixed to the connecting member 205, the upper and lower insulating valves 201 and 203 respectively have metallic layers 211 and 213 formed thereon by metallization in the same manner as in Example 5. These layers formed by metallization 211 and 213 are coated with alloy layers 315 and 317, respectively.

These alloy layers 315 and 317 have been bonded to the connecting member 205 with brazing materials 219 and 221, respectively. Thus, the two insulating valves 201 and 203 have been united with the connecting member 205.

The two insulating valves 201 and 203 have, on the outer circumferential surfaces thereof, glaze layers 223 and 225, respectively, which are the same as the glaze layer in Example 7.

This Example brings about the same effects as Example 7.

The invention should not be construed as being limited to the Examples give above in any way. It is a matter of course that the invention can be practiced in various modes unless these modes depart from the spirit of the invention.

For example, although Examples 5 and 6 showed embodiments in which the lower layer, i.e., a layer formed by metallization, and the upper layer, i.e., an alloy layer, were in direct contact with each other, such ceramic members may be modified so as to have an interlayer (e.g., a Ni—Mo alloy layer) disposed between the layer formed by metallization and the alloy layer and differing in constitution from these layers.

As described above in detail, in the process for producing a ceramic member for bonding of item 11 according to the invention, a metallic layer formed by metallization can be sufficiently sintered at low temperatures and, hence, the cost of production can be reduced. Furthermore, high dimensional accuracy and high bonding strength can be realized. In addition, since there is no need of conducting the plating and other treatments which have conventionally been necessary, a simplification in production process can be attained.

The ceramic member for bonding of item 15 according to the invention has a metallic layer formed by metallization which has undergone sufficient sintering even through low-temperature sintering. Consequently, this ceramic member is effective in reducing the sintering cost and has high dimensional accuracy and high bonding strength as in line 11. In addition, since there is no need of conducting the plating and other treatments which have conventionally been necessary, a simplification in production process can be attained.

Furthermore, the bonded objects of items 20 and 21 likewise have advantages of cost reduction, high bonding strength, and high dimensional accuracy because they have the ceramic member for bonding described above.

Moreover, the vacuum switch of item 22 according to the invention and the vacuum vessel of item 23 according to the invention likewise have advantages of cost reduction, high bonding strength, and high dimensional accuracy because they comprise a bonded object having the ceramic member for bonding described above.

We claim:

1. A ceramic member for bonding, which comprises:
   a ceramic base which is a sintered ceramic; and
   a metallic layer formed on the ceramic base by metallization,
   wherein the metallic layer comprises 70 to 85% by weight of at least one of tungsten and molybdenum, 0.5 to 8.5% by weight of nickel, and at least one of 1 to 3% by weight of manganese and 0.05 to 2.5% by weight of titanium.

2. The ceramic member for bonding according to claim 1, wherein the metallic layer further comprises 8 to 20% by weight of silicon in terms of $SiO_2$.

3. A ceramic member for bonding, which comprises:
   a ceramic base which is a sintered ceramic;
   a metallic layer formed by metallization on a surface of the ceramic base, wherein the metallic layer comprises molybdenum and nickel; and
   an alloy layer formed on a surface of the metallic layer either directly or through an interlayer, wherein the alloy layer comprises nickel and at least one of copper and manganese.

4. The ceramic member for bonding according to claim 3, wherein the metallic layer comprises 71 to 88% by weight of molybdenum and 0.7 to 5.5% by weight nickel.

5. The ceramic member for bonding according to claim 3, wherein the metallic layer further comprises 3.0 to 18.0% by weight of silicon in terms of $Si_2O$.

6. The ceramic member for bonding according to claim 3, wherein the alloy layer comprises 36 to 61.3% by weight of nickel and at least one of 33 to 60% by weight of copper and 2 to 30% by weight of manganese.

7. The ceramic member for bonding according to claim 3, having an interlayer provided between the metallic layer and the alloy layer, said interlayer comprising a nickel-molybdenum alloy.

8. A bonded object comprising a ceramic member for bonding according to claim 3, and a metallic member bonded to the ceramic member through said alloy layer and said metallic layer.

9. A bonded object comprising a ceramic member for bonding according to claim 3, and a second ceramic member for bonding, bonded to the ceramic member through said alloy layer and said metallic layer.

10. A bonded object comprising:
    a ceramic member for bonding, which comprises a ceramic base which is a sintered ceramic, and a metallic layer formed on the ceramic base by metallization, wherein the metallic layer comprises 70 to 85% by weight of at least one of tungsten and molybdenum, 0.5 to 8.5% by weight of nickel, and at least one of 1 to 3% by weight of manganese and 0.05 to 2.5% by weight of titanium; and
    a metallic member bonded to the ceramic member through the metallic layer of the ceramic member.

11. A vacuum switch comprising a bonded object according to claim 10.

12. A vacuum vessel comprising a bonded object according to claim 10.

13. A bonded object comprising:
    a ceramic member for bonding, which comprises a ceramic base which is a sintered ceramic, and a metallic layer formed on the ceramic base by metallization, wherein the metallic layer comprises 70 to 85% by weight of at least one of tungsten and molybdenum, 0.5 to 8.5% by weight of nickel, and at least one of 1 to 3% by weight of manganese and 0.05 to 2.5% by weight of titanium; and
    a second ceramic member for bonding, bonded to the ceramic member through the metallic layer of the ceramic member.

14. A vacuum switch comprising a bonded object according to claim 13.

15. A vacuum vessel comprising a bonded object according to claim 13.

16. A process for producing a ceramic member for bonding, said ceramic member comprising:
    a ceramic base which is a sintered ceramic; and
    a metallic layer formed on the ceramic base by metallization,
    wherein the metallic layer comprises 70 to 85% by weight of at least one of tungsten and molybdenum, 0.5 to 8.5% by weight of nickel, and at least one of 1 to 3% by weight of manganese and 0.05 to 2.5% by weight of titanium,
    which method comprises:
    mixing a mixture comprising nickel particles, at least one of manganese and titanium particles, and at least one of tungsten particles and molybdenum particles with an organic binder, to produce a paste;
    applying the paste to a ceramic base which is a sintered ceramic, to form a layer; and
    baking the layer to form the metallic layer.

17. The process for producing a ceramic member for bonding according to claim 16, wherein the paste further comprises $SiO_2$ particles.

18. The process for producing a ceramic member for bonding according to claim 16, wherein said baking is carried out at a temperature of 1080° C. to 1250° C.

19. A process for producing the ceramic member for bonding, said ceramic member comprising:
    a ceramic base which is a sintered ceramic;
    a metallic layer formed by metallization on a surface of the ceramic base, wherein the metallic layer comprises molybdenum and nickel; and
    an alloy layer formed on a surface of the metallic layer either directly or through an interlayer, wherein the alloy layer comprises nickel and at least one of copper and manganese,
    which method comprises:
    a first step which comprises preparing a first paste by mixing a first mixture comprising molybdenum particles and nickel particles with an organic binder, applying the first paste to a ceramic base which is a sintered ceramic and drying the resultant coating layer to form a first layer;
    a second step which comprises preparing a second paste by mixing a second mixture i) comprising at least one of nickel particles and nickel oxide, and at least one selected from the group consisting of copper particles, copper oxide particles, manganese particles, and manganese oxide particles or ii) comprising at least one of nickel-copper alloy particles and nickel-manganese alloy particles with an organic binder, applying the second paste to the first layer and drying the resultant coating layer to form a second layer; and baking the first layer and the second layer to form the metallic layer and the alloy layer, respectively.

20. The process for producing a ceramic member for bonding according to claim 19, wherein the first mixture comprises 70 to 94% by weight of molybdenum particles and 1 to 10% by weight of nickel particles.

21. The process for producing a ceramic member for bonding according to claim 19, wherein the first mixture further comprises silicon oxide in an amount of 2 to 23% by weight.

22. The process for producing a ceramic member for bonding according to claim 19, wherein the second mixture comprises at least one of nickel particles and nickel oxide in an amount of 35 to 75% by weight and at least one selected from the group consisting of copper particles, copper oxide particles, manganese particles, and manganese oxide particles in an amount of 25 to 65% by weight.

23. The process for producing a ceramic member for bonding according to claim 19, which comprises baking the first and second layers at the same time.

24. The process for producing a ceramic member for bonding according to claim 19, which comprises baking the first layer after the first step and baking the second layer after the second step.

25. The process for producing a ceramic member for bonding according to claim 19, which comprises baking at a temperature of 1080° C. to 1180° C.

* * * * *